United States Patent
McCavit et al.

(10) Patent No.: US 11,112,077 B2
(45) Date of Patent: Sep. 7, 2021

(54) ILLUMINATED ORNAMENT POWERED BY VERTICAL AXIS WIND TURBINE

(71) Applicant: Jenesis International Inc., Benton Harbor, MI (US)

(72) Inventors: Kim Irwin McCavit, Saint Joseph, MI (US); Mark Adam Goldy, Anthem, AZ (US); Roger Don Bentley, Coloma, MI (US); Robert H. Ashton, Watervliet, MI (US)

(73) Assignee: Jenesis International Inc., Benton Harbor, MI (US)

( * ) Notice: Subject to any disclaimer, the term of this patent is extended or adjusted under 35 U.S.C. 154(b) by 0 days.

(21) Appl. No.: 16/796,823

(22) Filed: Feb. 20, 2020

(65) Prior Publication Data

US 2020/0271293 A1   Aug. 27, 2020

Related U.S. Application Data

(60) Provisional application No. 62/809,217, filed on Feb. 22, 2019.

(51) Int. Cl.
*F21S 9/02*    (2006.01)
*F21S 6/00*    (2006.01)
(Continued)

(52) U.S. Cl.
CPC .............. *F21S 9/026* (2013.01); *F03D 3/005* (2013.01); *F03D 3/064* (2013.01); *F03D 9/11* (2016.05);
(Continued)

(58) Field of Classification Search
CPC .. F21S 9/026; F21S 6/005; F03D 9/25; F03D 9/11; F03D 3/064; F03D 3/005;
(Continued)

(56) References Cited

U.S. PATENT DOCUMENTS 4,359,311 A   11/1982 Benesh
4,362,470 A   12/1982 Locastro et al.
(Continued)

FOREIGN PATENT DOCUMENTS

CN   105020100 A   * 11/2015
CN   105020100 A     11/2015
(Continued)

OTHER PUBLICATIONS

Machine English Translation of CN-105020100-A; Zheng Xiaoling (Year: 2015).*

(Continued)

*Primary Examiner* — Rajarshi Chakraborty
*Assistant Examiner* — Glenn D Zimmerman
(74) *Attorney, Agent, or Firm* — George Pappas; Barrett McNagny LLP

(57) ABSTRACT

A decorative ornament powered by a vertical axis wind turbine. The turbine includes blades that rotate about a centrally located vertical shaft. An LED illuminated globe is centrally located within the rotating blades and is secured atop the shaft. An alternator is located below the globe and is coupled to the rotating blades. The blades are shaped having a leading cupped section joined to a lagging airfoil section. The leading cup section is defined by a cup radius r and the lagging airfoil section is defined by an airfoil chord length CL. The cup radius r and chord length CL both decrease towards the terminal bottom and top ends of the blade. Also, the airfoil section is located a radial distance Cd from the vertical axis and the radial distance Cd decreases towards the terminal bottom and top ends of the blade.

20 Claims, 31 Drawing Sheets

(51) Int. Cl.
*F03D 9/11* (2016.01)
*F03D 3/06* (2006.01)
*F03D 3/00* (2006.01)
*F03D 9/25* (2016.01)
*H02J 7/14* (2006.01)
*F21W 121/00* (2006.01)
*F21Y 115/10* (2016.01)

(52) U.S. Cl.
CPC ............ *F03D 9/25* (2016.05); *F21S 6/005* (2013.01); *H02J 7/14* (2013.01); *F05B 2240/211* (2013.01); *F21W 2121/00* (2013.01); *F21Y 2115/10* (2016.08)

(58) Field of Classification Search
CPC ............ F03D 3/061; F05B 2240/211; F05B 2250/71; F21W 2121/00; F21Y 2115/10; Y02E 70/30; Y02E 10/74; Y02E 10/76; H02J 7/34; H02J 2300/28; H02J 7/14
See application file for complete search history.

(56) References Cited

U.S. PATENT DOCUMENTS

| | | | |
|---|---|---|---|
| 6,086,214 A | | 7/2000 | Ridge |
| 7,843,077 B2 | | 11/2010 | Arduini |
| 8,851,838 B2 | | 10/2014 | Kim |
| 9,249,783 B2 * | | 2/2016 | Selsam ............... F03D 1/025 |
| 9,404,474 B2 | | 8/2016 | Watanabe |
| 9,494,136 B1 * | | 11/2016 | Edmiston ............ F03D 3/061 |
| 2001/0004812 A1 * | | 6/2001 | Lindaman ............ A01M 31/06 |
| | | | 43/2 |
| 2007/0036650 A1 | | 2/2007 | Lau |
| 2008/0284168 A1 * | | 11/2008 | Arduini ................ F16D 48/06 |
| | | | 290/43 |
| 2009/0086465 A1 * | | 4/2009 | St-Germain ........ G09F 15/0087 |
| | | | 362/89 |
| 2010/0060001 A1 | | 3/2010 | Gabrys |
| 2011/0031756 A1 * | | 2/2011 | Gabrys ................. F03D 3/02 |
| | | | 290/55 |
| 2011/0057452 A1 | | 3/2011 | Interlandi et al. |
| 2013/0287591 A1 | | 10/2013 | Plourde et al. |
| 2015/0285487 A1 * | | 10/2015 | Kochanski ............ F21K 9/23 |
| | | | 362/235 |
| 2016/0111936 A1 | | 4/2016 | Halstead |
| 2017/0067442 A1 * | | 3/2017 | Potter .................. F03D 7/06 |
| 2017/0067444 A1 | | 3/2017 | Skelton et al. |
| 2017/0338725 A1 * | | 11/2017 | Stevens ............... H02K 1/2733 |
| 2019/0093629 A1 | | 3/2019 | Juarez |

FOREIGN PATENT DOCUMENTS

| | | |
|---|---|---|
| KR | 10-2013-0058564 A | 6/2013 |
| WO | 2007/064155 | 6/2007 |
| WO | 2009/075853 A1 | 6/2009 |
| WO | WO 2009/075853 A1 | 6/2009 |
| WO | 2010/135032 A1 | 11/2010 |
| WO | WO 2010/135032 A1 | 11/2010 |
| WO | 2017/156135 A1 | 9/2017 |

OTHER PUBLICATIONS

International Search Report in related PCT/US2020/019233.
Written Opinion of the International Searching Authority in related PCT/US2020/019233.
International Search Report in related PCT/US2020/019233, dated May 11, 2020.
Written Opinion of the ISA in related PCT/US2020/019233, dated May 11, 2020.
International Search Report in related PCT/US2020/019228.
Written Opinion of the ISA in related PCT/US2020/019228.

* cited by examiner

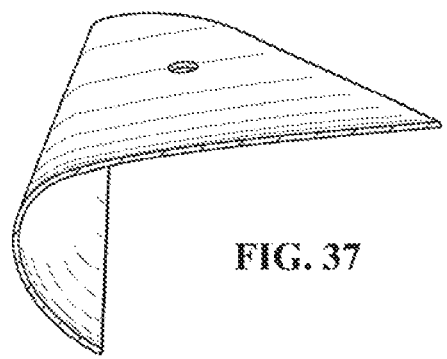
FIG. 37
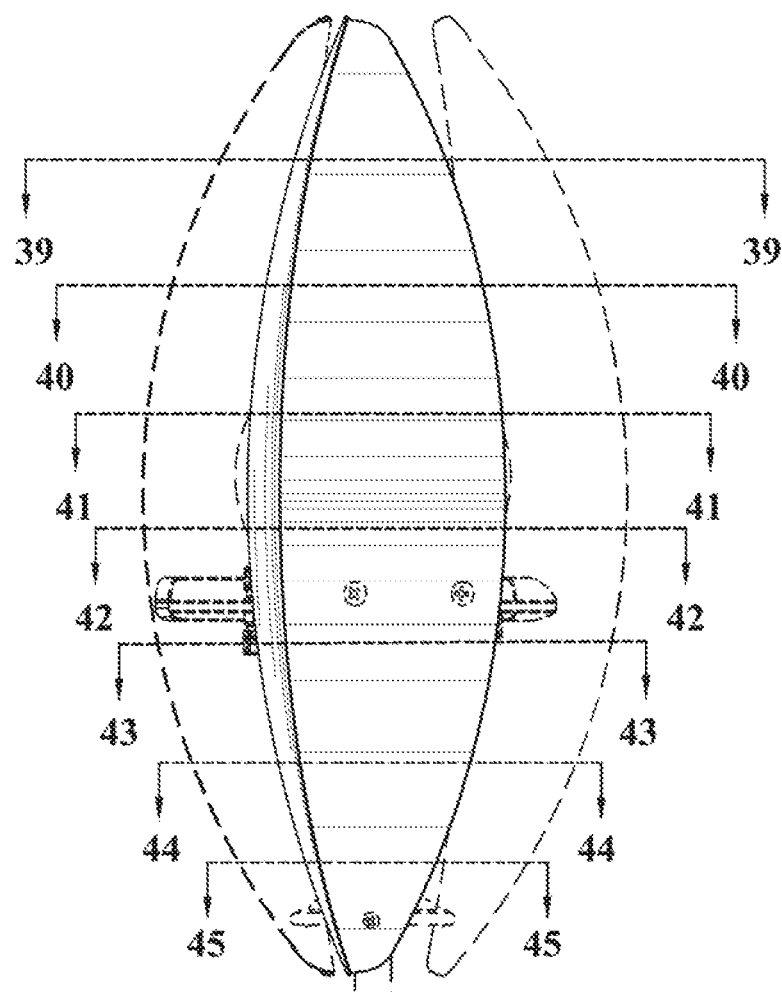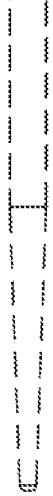
FIG. 38

ILLUMINATED ORNAMENT POWERED BY VERTICAL AXIS WIND TURBINE

CROSS REFERENCE TO RELATED APPLICATIONS

This application claims priority under 35 U.S.C. 119(e) of U.S. provisional patent application Ser. No. 62/809,217 filed on Feb. 22, 2019 entitled Vertical Axis Wind Turbine Blade and Illuminated Ornament Powered by a Vertical Axis Wind Turbine, the disclosure of which is hereby incorporated herein by reference.

BACKGROUND OF THE INVENTION

1. Field of the Invention

The present invention relates generally to a wind powered vertical axis wind turbine and an illuminated ornament which utilizes a vertical axis wind turbine to charge a rechargeable battery. Energy stored in the battery is used to illuminate a decorative ornament at night. The present invention is also directed to a curved blade design for a vertical axis wind turbine which provides improved performance relative to traditional straight blades per unit of surface area.

2. Background

Decorative devices that move in the wind, often referred to as wind sculptures or wind spinners, are popular as lawn decorations. During the day, if it is windy, they provide a colorful moving display. Some also include a generator or alternator that illuminates light emitting diodes (LED's) at night when the device is spinning in the wind.

Vertical axis wind turbines (VAWT) lend themselves well to decorative lawn ornaments since the blades rotate at a fixed distance from a central vertical axis. The volume enclosed within the rotating blades provides a convenient and attractive location for an illuminated decorative ornament and the alternator and electronics needed to charge a battery and control the LED illumination. It is desirable that the blades used in a VAWT operate in both drag and lift modes. Drag mode operation allows power generation in light wind and insures that the VAWT is self-starting in almost all wind conditions. Lift mode operation at higher wind speeds optimizes power generation by increasing the tip speed ratio (TSR) which is the ratio between the tangential speed of the tip of the blade to the actual speed of the wind. The blade shapes typically used for VAWT's that combine drag and lift mode are lacking in aesthetic qualities and do not provide optimum performance. Therefore there is a need for a combined drag/lift mode VAWT blade design with improved aesthetics and performance.

SUMMARY OF THE INVENTION

The present invention overcomes disadvantages of prior combined drag/lift mode VAWT blade designs intended to be used with an illuminated ornament located within a volume enclosed by the rotating blades.

One object of the invention is to provide a combined drag/lift mode VAWT blade design that produces more power per unit surface area of the blade.

Another object of the invention is to provide a combined drag/lift mode VAWT blade design that increases the area under the curve on a plot of full-system power (Cp) versus wind tip speed ratio (TSR) to improve system performance while the turbine revolutions per minute (RPM) is lagging behind changing wind speeds.

Another object of the invention, is to provide a combined drag/lift mode VAWT blade design with increased hysteresis in the power transfer curve as load impedance is increased compared to as load impedance is decreased in order to improve performance in variable wind conditions.

Another object of the invention is to provide a control system that ensures that the system operating point is on the optimum portion of the hysteresis curve.

Another object of the invention is to provide a combined drag/lift mode VAWT blade design that minimizes turbulence and noise at the blade ends.

Another object of the invention is to provide a combined drag/lift mode VAWT blade design that causes specular reflections from sunlight at multiple elevations during the day to reach the eye of an observer.

Another object of the invention is to provide a combined drag/lift mode VAWT blade design that is self-starting.

Another object of the invention is to provide a combined drag/lift mode VAWT blade design that spins freely in winds that are too slow to create useful power output but are fast enough to create a pleasing visual experience.

Another object of the invention is to provide a VAWT with an alternator consisting of a rotor with a self-contained stator, where the rotor is attached to multiple blades at a centralized location and includes an illuminated ornament within the blades and in close proximity to the rotor.

Another object of the invention is to provide VAWT with a stator that attaches to a shaft with a terminal end that is mounted to a decorative assembly that includes a light emitting diode (LED) for illumination, a battery to store energy derived from the wind, electronics to control the charging of the battery and the illumination of the LED, all enclosed within a decorative ornament that is illuminated by the LED.

In one form thereof, the present invention is directed to a decorative ornament including: a vertical axis wind turbine comprising a plurality of blades adapted to rotate about a centrally located vertical shaft; wherein the vertical shaft comprises a top terminal end; a light emitting device secured to and located above the shaft top terminal end and within the rotating turbine blades; and, an alternator coupled to the blades and adapted to produce electric power for powering the light emitting device.

Preferably, the alternator is located within the rotating turbine blades and includes: a rotor rotatably coupled to the shaft; wherein the blades are secured to and rotatably drive the rotor about the shaft; a plurality of magnets secured to the rotor; a stator fixedly secured to the shaft; a plurality of coils of wire secured to the stator; and, when the rotor is rotably driven, the magnets travel adjacent and induce electric current in the coils of wire. The rotor comprises upper and lower magnet holders whereat the plurality of magnets are secured and the stator is sandwiched between the upper and lower magnet holders.

The vertical shaft can include a bottom terminal end selectively attachable to a top terminal end of a ground mounting stake. A translucent enclosure can be located above the shaft top terminal end and within the rotating turbine blades and wherein light emitted by the light emitting device is directed within the enclosure. Alternatively, a translucent globe enclosure can be located above the shaft top terminal end and within the rotating turbine blades and wherein the light emitting device is located within the globe enclosure. An electric power storage device is preferably operatively connected to the alternator and the light emitting device.

The blades can extend vertically between terminal bottom and top ends and the blades are secured to the rotor at a vertical midpoint between the terminal bottom and top ends. The blades can be secured to each other at a terminal bottom end thereof. Preferably, the blades are coupled to a rotor of the alternator, wherein the blades are attached to the rotor below a vertical midpoint between bottom and top terminal ends of the blades and wherein the blades are secured to each other at their bottom terminal end.

More preferably, each of the blades include: a leading cupped section joined to a lagging airfoil section, wherein the leading cup section is defined by a cup radius r and the lagging airfoil section is defined by an airfoil chord length $C_L$; wherein the leading cupped section and lagging airfoil section extend vertically a distance h between terminal bottom and top ends; and, wherein the cup radius r and chord length $C_L$ both decrease towards the terminal bottom and top ends of the blade. Preferably, the cup radius r and chord length CL both decrease towards the terminal bottom and top ends of the blade starting form a vertical midpoint between the terminal bottom and top ends.

Further preferably, the airfoil section is located a radial distance $C_d$ from the vertical axis and wherein the radial distance $C_d$ decreases towards the terminal bottom and top ends of the blade starting form a vertical midpoint between the terminal bottom and top ends. Also, the airfoil section can be located a radial distance $C_d$ from the vertical axis and wherein the radial distance $C_d$ decreases towards the terminal bottom and top ends of the blade.

The leading cupped section can extend between an outermost edge and an inner area, wherein the inner area is joined with the airfoil section and the outermost edge traverses along an arcuate path defined by a diameter D as the blades rotate about the vertical axis and $r/D<C_L/D<1$. The blades are preferably formed of sheet material.

The alternator can be selectively connectable to an electric power storage device through a load switch and further wherein, when an output of the alternator is insufficient to produce useful power, the electric power storage device is disconnected from the alternator and, after the blades and alternator gain momentum, the electric power storage device is again connected to the alternator.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein:

FIG. 37 is a cross section view taken along line 37-37 of FIG. 24;

FIG. 38 is an front elevation view of the vertical axis wind turbine and ornamental light globe shown in FIG. 1;

Figure 1:
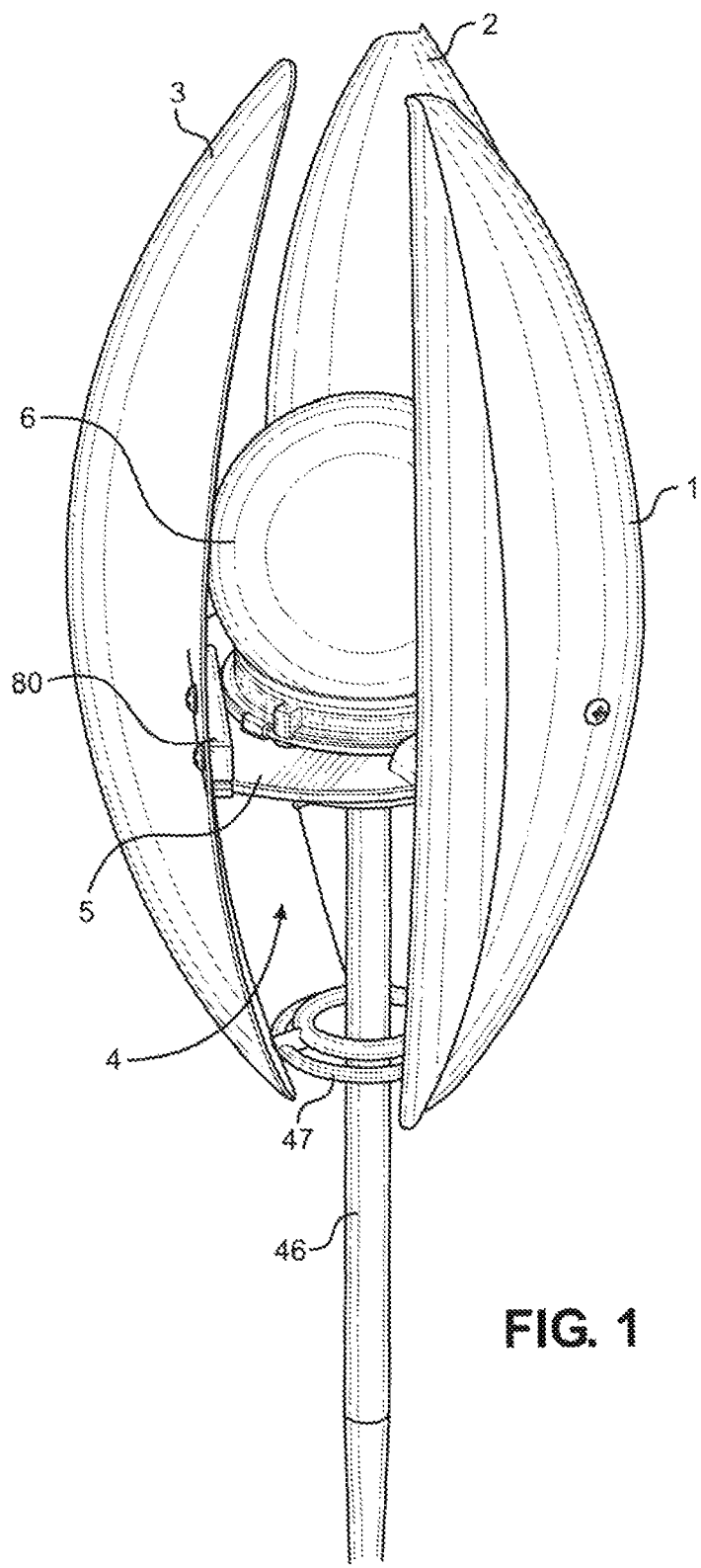
FIG. 1 shows an embodiment of a wind powered alternator and an embodiment of a decorative ornament which are constructed in accordance with the principles of the present invention.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

FIG. 1 shows a preferred embodiment of a wind powered alternator (4) intended for powering decorative lighting such a decorative ornament (6). Three blades, also sometimes referred to as wings, (1 thru 3) cause the rotor (5) of the alternator (4) to rotate in the wind. The rotor (5) is permanently attached to blades 1 thru 3 and the stator (85) is permanently attached to a shaft (81). The rotor (5) includes eight internal magnets (90), with four of the magnets secured to a lower magnet holder (84) and four of the magnets secured to an upper magnet holder (86). The shaft (81) passes through alternator (4) and is rotatably coupled to the rotor (5) by two bearings (92) that allow the rotor (5) and the lower and upper magnet holders (84), (86) to rotate about the shaft (81). The stator (85) comprises four coils of wire (93) and is sandwiched between the rotor magnet holders (84), (86). The shaft (81) attaches to a mounting stake (46). A stabilizer (47) prevents centripetal forces from spreading the blade ends during high winds.

In a preferred embodiment, the decorative ornament (6) is centrally located within the blades (1) (2) (3) and occupies a large portion of the volume within the blades so that, aside from the blades, the decorative ornament is the dominant visual feature. In the case where the decorative ornament is essentially a sphere, this means the diameter of the sphere should be 30% or more of the diameter of a circle that would inscribe the blades at their maximum horizontal cross section. For non-spherical decorative ornaments, the diameter of a circle that inscribes the maximum horizontal cross section of the decorative ornament should be 30% or more of the diameter of a circle that would inscribe the blades at their maximum horizontal cross section. The alternator (4) is mounted directly below the decorative ornament (6) to help conceal the alternator and make the ornament (6) the dominant feature within the spinning blades (1) (2) (3). The rotor (5) positions the blades such that they are very close to the decorative ornament (6) which helps conceal the rotor (6) and helps insure that the dominant visual features are the blades and the decorative ornament.

The blades (1 thru 3) spin the rotor (5) to create an electromotive force (EMF) and induce an electric current/electric power in the coils (93) as those skilled in the art will understand. The faster the alternator rotor (5) rotates, the stronger is the EMF produced. The decorative ornament (6) sits within the blades (1) (2) (3) and is illuminated at night by an LED (95). A rechargeable battery (96) within the decorative ornament (6) is charged by the alternator (4) when the blades rotate and provides power for the LED (95). An electronic circuit (94) optimizes the charging of the battery (96) and controls the illumination of the LED (95).

Figure 2:
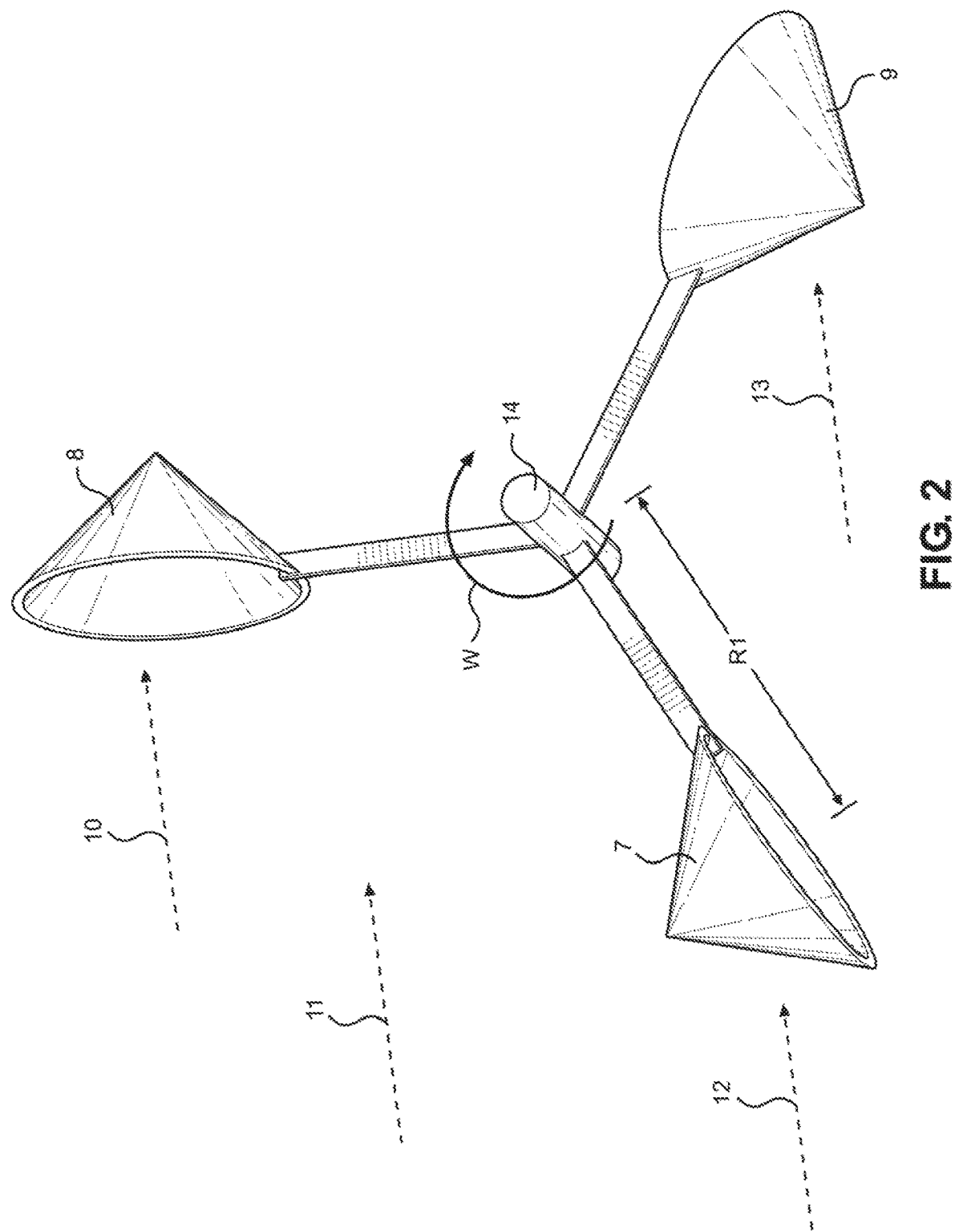
FIG. 2 shows a simplified schematic drawing of a wind powered alternator with simplified blades.

FIG. 2 shows a simplified schematic drawing of a wind powered turbine with simplified blades (7 thru 9) at radial distance R1 from the center of rotation. An alternator (not shown in FIG. 2) is attached to shaft (14). Vectors (10 thru 13) represent the direction and speed of the wind and are assumed to be equal. As those skilled in the art will understand, the concave section of blade (8) interacting with wind vector (10) will produce more torque than the non-concave sections of blades (7) and (8) interacting with wind vectors (12) and (13). This will result in clockwise rotation around shaft (14). When blade (8) is moving in line with the wind vector (10), its tangential velocity will be some fraction of the wind speed. This fraction is known as the tip speed ratio or TSR. This tangential velocity results in an angular velocity W that is inversely proportional to the radial distance R1 of the blade from the center of rotation. As those skilled in the art will understand, for an unloaded alternator the TSR will remain relatively constant as the radial distance R1 is decreased. The result is that the EMF produced by the alternator increases in inverse proportion to decreases in radial distance R1. For an alternator that is driving a load, the TSR will decrease as the radial distance R1 is reduced due to a reduction in available torque. However, for a lightly loaded alternator, the reduction in TSR is more than offset by the increase in angular velocity W. All alternators in the following discussions are assumed to be lightly loaded. The result is that for a given wind speed, more power will be produced by blades that are closer to the center of rotation. There is, however, a drawback to moving the blades too close the center of rotation. If the blades are initially stationary, the inertia and friction of the system must be overcome to initiate rotation. Referring again to FIG. 2 and assuming the blades are not initially rotating, the torque produced by the concave section of blade (8) is opposed by the torque on blades (7) and (9). The resultant torque is the difference between torque on blade (8) and torques on blades (7) and (9). Since these torques are all directly proportional to the radial distance of the blades from the center of rotation, the differential torque applied to the stationary system will be greater if the radial distance R1 is greater. This means that it will take less wind to overcome the inertia and friction of the system if the blades are further from the center of rotation. Therefore, there is a tradeoff between keeping the radial distance of the blades R1 great enough that the inertia and friction of the system is overcome in light winds, and the desire to reduce the radial distance R1 to maximize the produced EMF while the alternator is spinning.

Figure 3:
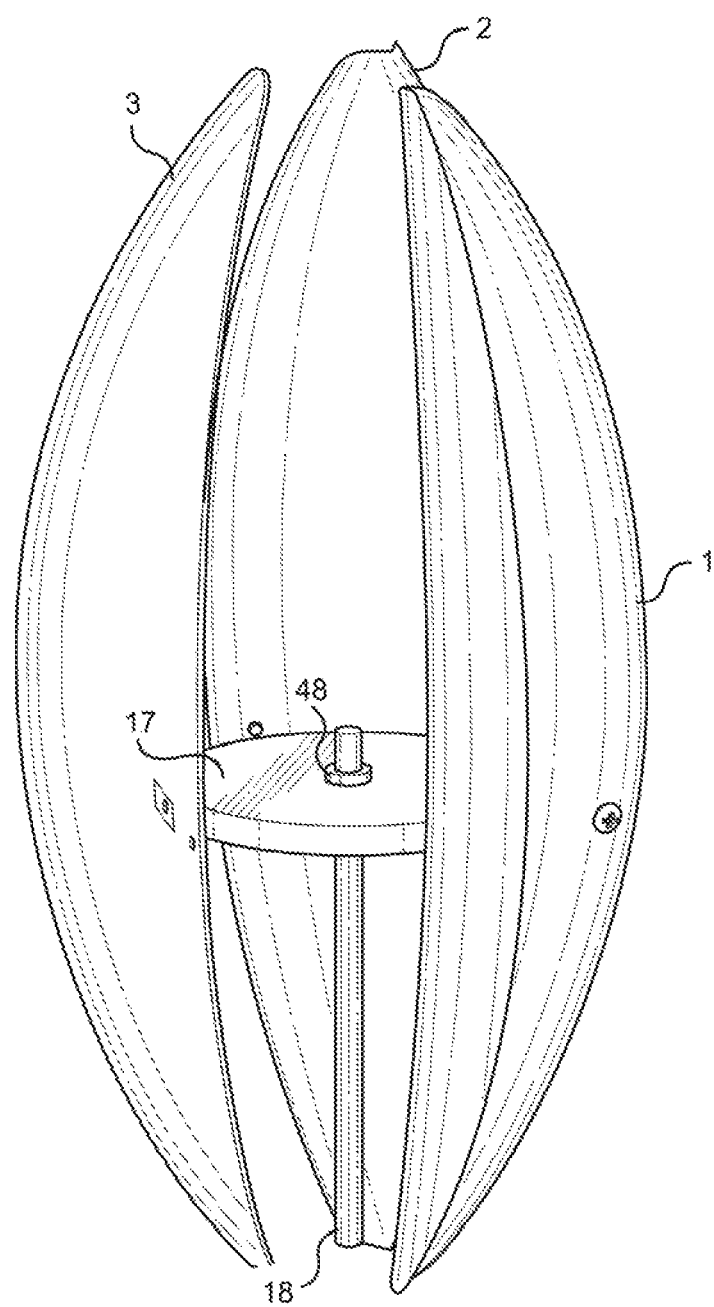
FIG. 3 is a simplified version of the wind powered alternator of FIG. 1 with the decorative lighting removed.

To simplify further discussions, FIG. 3 is a simplified version of FIG. 1 where the decorative ornament (6) and the alternator (4) have been replaced with a simple shaft/axis of rotaton (18) that is connected to simple rotor (17) by a bearing (48). Rotor (17) attaches to the blades (1)(2)(3) and can rotate about shaft (18).

Figure 4:
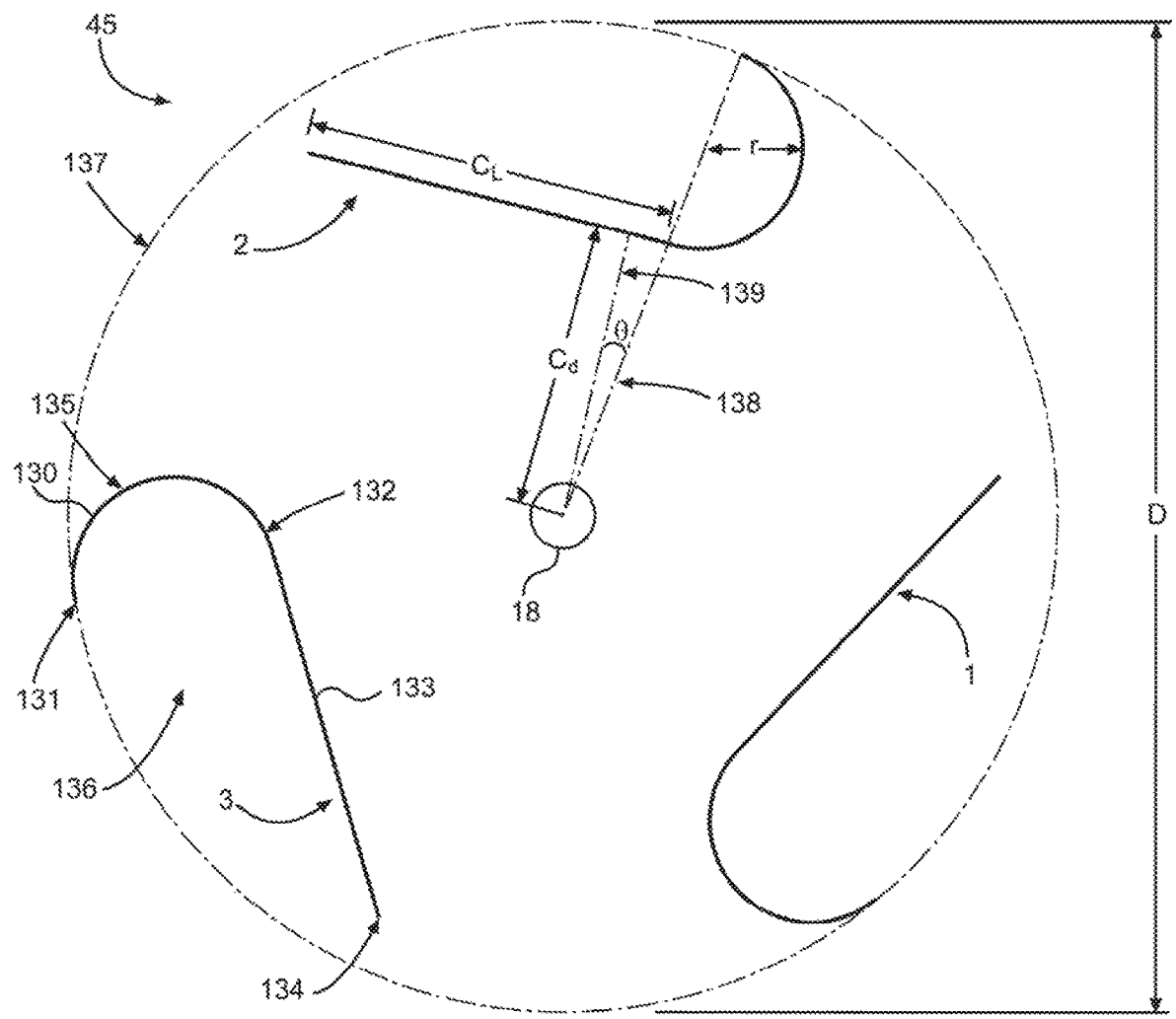
FIG. 4 shows a cross section of the structure of the blades in FIG. 3 taken along line 4-4 of FIG. 3 at the vertical midpoint of the blades.

The shape of the blades (1), (2) and (3) is shown in FIG. 4 and FIGS. 22-45. FIG. 4 shows a cross section (generally designated by the numeral (45)) of the structure in FIG. 3 taken at the vertical midpoint of the blades (1), (2) and (3). The blades are assumed to be made from thin sheet metal or plastic and are shown as simple lines in the figure, although in reality they would have some thickness. Those familiar with the art will recognize that the shape of each blade cross section is of a form that is somewhat similar to that which is typically used in a Lenz type vertical axis wind turbine. However, the characteristics of the sheet material shape of present blades (1), (2) and (3), as seen in the cross section of FIG. 4, can be defined by: a leading cupped/arcuate shaped section 130 extending between an outermost edge 131 and an inner area 132 and defined by a cup radius r; and, an airfoil section 133 joined, preferably integrally, with the leading cupped section 130 at the cup section inner area 132 and extending perpendicular to the vertical axis of rotation 18 to a lagging/back edge 134 a chord length distance $C_L$. The leading cupped section 130 thereby defines an arcuate leading face surface 135 and a lagging pocket 136. The cup radius r and the chord length $C_L$, in turn, can be defined as fractions of the diameter D of an imaginary circle/arcuate path or plane 137 that encloses the cross section of the three blades (1)(2) and (3). The leading cupped section outermost edges 131 of each of the blades (1), (2) and (3) travel along the imaginary circle/arcuate path or plane 137 as the blades rotate about the vertical axis/shaft 18. In the most general of terms, these relationships can be described by: $r/D < C_L/D < 1$. These ratios and the attack angle $\Theta$ (the angle between an outermost edge plane 38 which is coplanar with the vertical axis/shaft 18 and the outermost edge 131 of the leading cupped section 130, and an airfoil section plane 139 which is coplanar with the vertical axis/shaft 18 and is perpendicular to the airfoil section 133), along with the distance of the radial chord length $C_d$ (the radial distance of the airfoil section plane 139 from the vertical axis/shaft 18 to the airfoil 133)), completely define the blade shape and their positions at any particular elevation along the vertical length/height h of each of the blades (1), (2) and (3). In a preferred embodiment of the invention, these ratios at the vertical midpoint of the blade would be given by: $r_m/D_m = 0.10$; $C_{Lm}/D_m = 0.38$; with $\Theta = 7.5°$, $C_d = 53.5$ mm, and $D = 181.3$ mm, where the subscript m indicates the cross section at the vertical midpoint of the blades.

Figure 5:
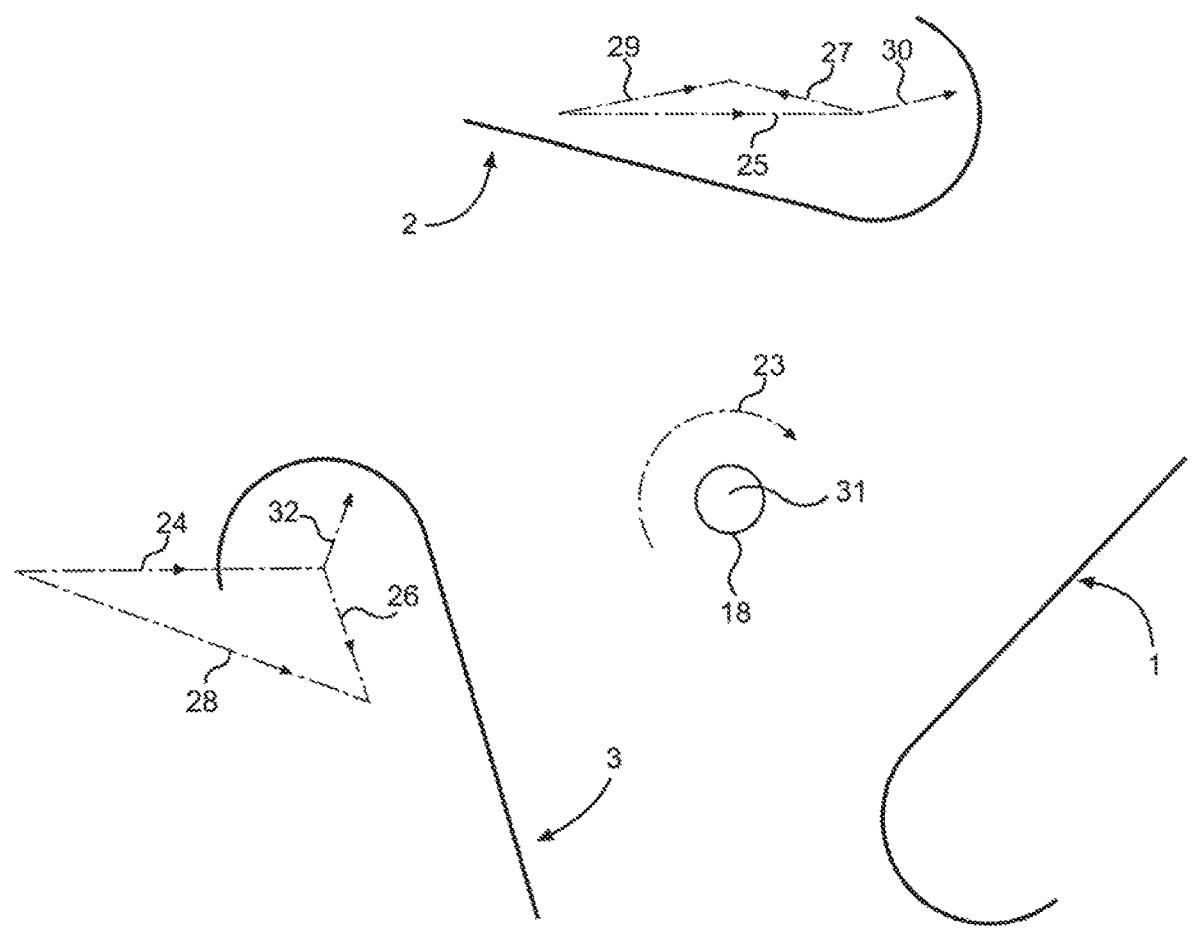
FIG. 5 shows the blades as in FIG. 4 with the addition of wind vectors to help explain the operation of the wind powered alternator.

FIG. 5 shows the blades as in FIG. 4 with the addition of wind vectors to help explain the operation of the present wind powered alternator. It is assumed the blades (1), (2), and (3) are rotating clockwise around shaft (18) as indicated by arrow (23). The wind is represented by two equal vectors (24) and (25). At each blade, the rotation (23) results in an airspeed due to rotation that is tangent to the direction of the blade at that location. For blade (3), the airspeed due to rotation is indicated by vector (26). For blade (2), the airspeed due to rotation is indicated by vector (27). Vectors (26) and (27) have equal magnitudes. Referring now to blade (2), the addition of vectors (25) and (27) define a resultant air flow (29). The resultant air flow (29) has a magnitude that is less than the magnitude of the wind vector (25) and produces a drag force (30) which causes blade (2) to rotate clockwise around center of rotation (31). Referring now to blade (3), the addition of vectors (24) and (26) define a resultant air flow (28). The resultant air flow (28) has a magnitude that is greater than the magnitude of the wind vector (25) and has a positive angle of attack relative to blade (3). As those skilled in the art will recognize, this produces a lift force (32) which causes blade (3) to rotate clockwise around center of rotation (31). As the magnitude of resultant air flow (28) is greater than the magnitude of wind speed (24), wind turbines that use this principle can achieve TSR's greater than one. It is the same principle that allows sailboats to achieve speeds greater than the wind speed when they are tacking and is often likened to the sail (or blade) creating its own wind.

Referring again to FIG. 5, it can be seen that at low RPM's, the airspeed due to rotation vector (23) will be small and the resultant air flow (28) will be nearly equivalent to the wind vector (24). Under these conditions, the lift force (32) will be small. At blade (2) the resultant air flow vector (29) will also be nearly equivalent to wind vector (25), but in this case vector (29) will be near its maximum value resulting in a large drag force (30). Under these conditions, drag force is the dominant force causing the blades to rotate. With increasing RPM the magnitude of the airspeed due to rotation vectors increase. The result is that the magnitude of resultant air flow (29) and drag force (30) decrease and the magnitude of resultant air flow (28) and lift force (32) increase. At higher RPM's, lift force (32) will be the dominant force causing the blades to rotate.

It is noted that in the following discussions data is presented that was obtained from measurements made in a wind tunnel at wind speeds of approximately 7 MPH. These measurements are very noisy. For clarity, the data has been averaged and smoothed to a thin line when presented in graphical form.

Figure 6:
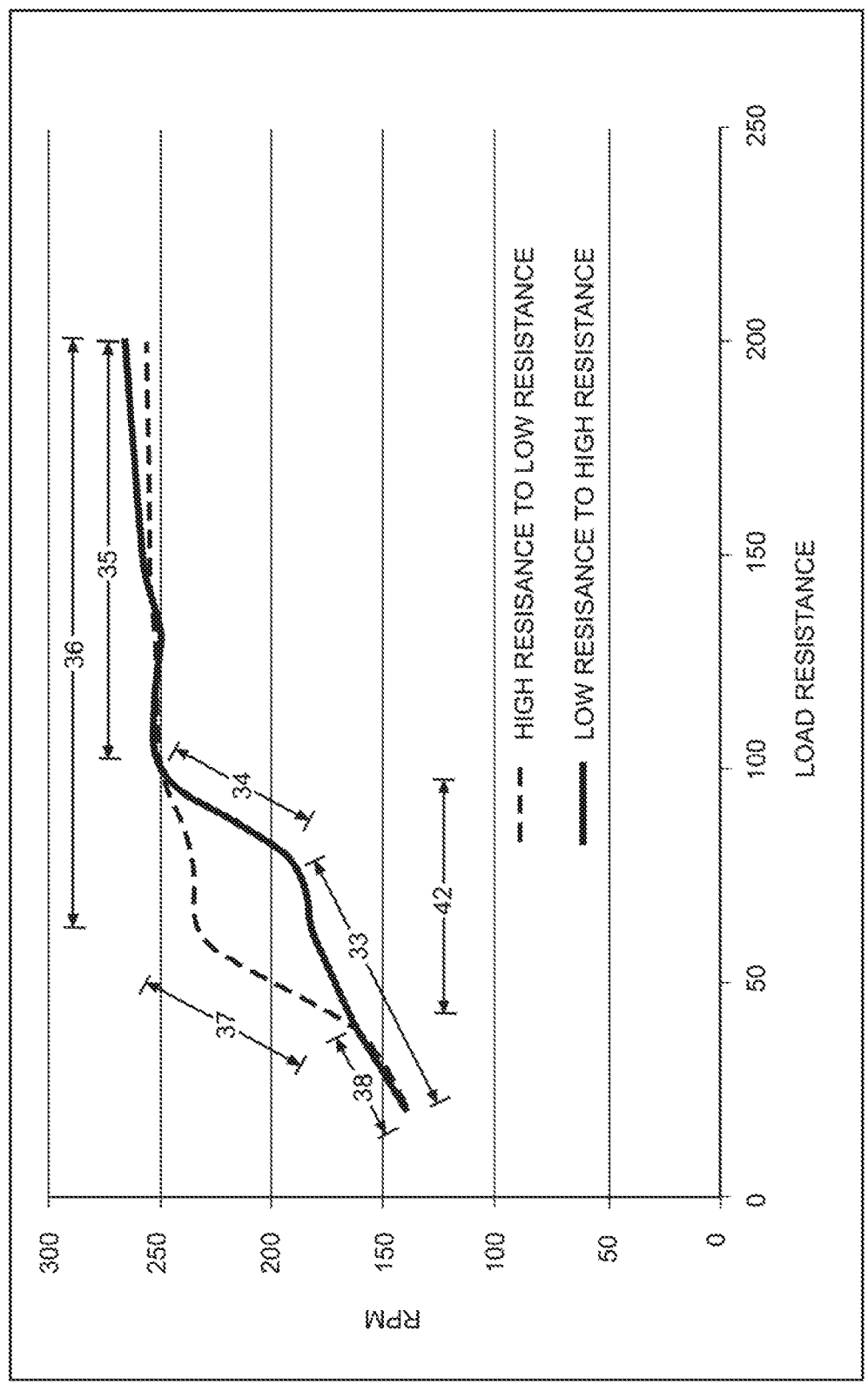
FIG. 6 illustrates the transitions that occur between lift and drag dominated regions of operation from a test of the wind powered alternator shown in FIG. 1.

FIG. 6 illustrates the transitions that occur between lift and drag dominated regions of operation. RPM data was taken on a wind powered alternator as in FIG. 1 in a wind tunnel at approximately 7 mph. When the load resistance is low, the relatively large back EMF in the alternator slows the alternator down resulting in lower RPM. When the load resistance is high, the alternator spins more freely resulting in higher RPM's. The solid line shows RPM data taken starting with a 20 ohm load and gradually increasing the load resistance to 200 ohms. In the region labeled (33), as the load resistance is gradually increased from 20 ohms, the RPM also gradually increases. The drag force shown in FIG. 5 is dominant in this region. In the region labeled (34) the lift force shown in FIG. 5 becomes comparable to the drag force resulting in a more rapid increase in RPM as the load resistance is increased. Finally, in region (35), the lift force dominates.

Continuing to refer to FIG. 6, the dotted line graph shows RPM vs load resistance as the load resistance is reduced from 200 ohms. At 200 ohms, the lift force is dominant and the RPM is high. As the load resistance is decreased, the region where the lift force is dominant (36) can be seen to extend to a lower load resistances than region (35), followed by a transition region (37) to a region (38) where the drag force is again dominant. Lift dominant region (36) is extended since once in lift mode the wind powered alternator is 'making its own wind' and can use its own wind to remain in lift mode at lower load resistances. In the region labeled (42), for the same load resistance, there are two possible RPM values. As discussed next, it is always desirable to operate at the higher RPM value.

Figure 7:
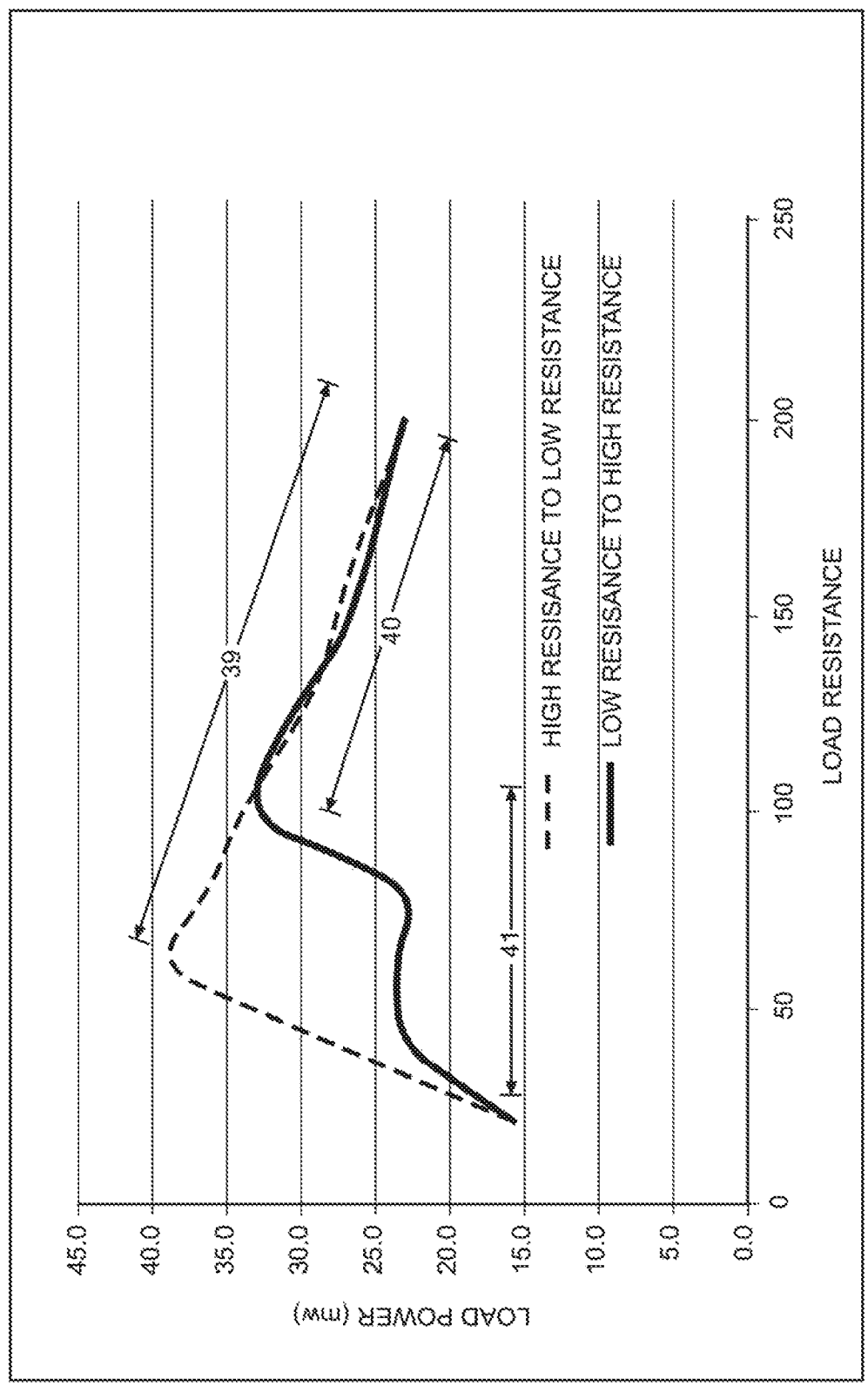
FIG. 7 shows output power data from the same test of the wind powered alternator of FIG. 1.

FIG. 7 shows output power data from the same test of the wind powered alternator. Again, the dotted line represents output power as the load resistance is decreased gradually from 200 ohms where the lift force in FIG. 5 is dominant. As with the RPM data, the lift mode region when starting at high load resistance (39) is extended compared to the lift mode region when starting at low impedance (40). In the region labeled (41), for a given load resistance, there are two possible output powers. To maximize power production it is desirable to keep the system's operating point on the dotted line.

Figure 8:
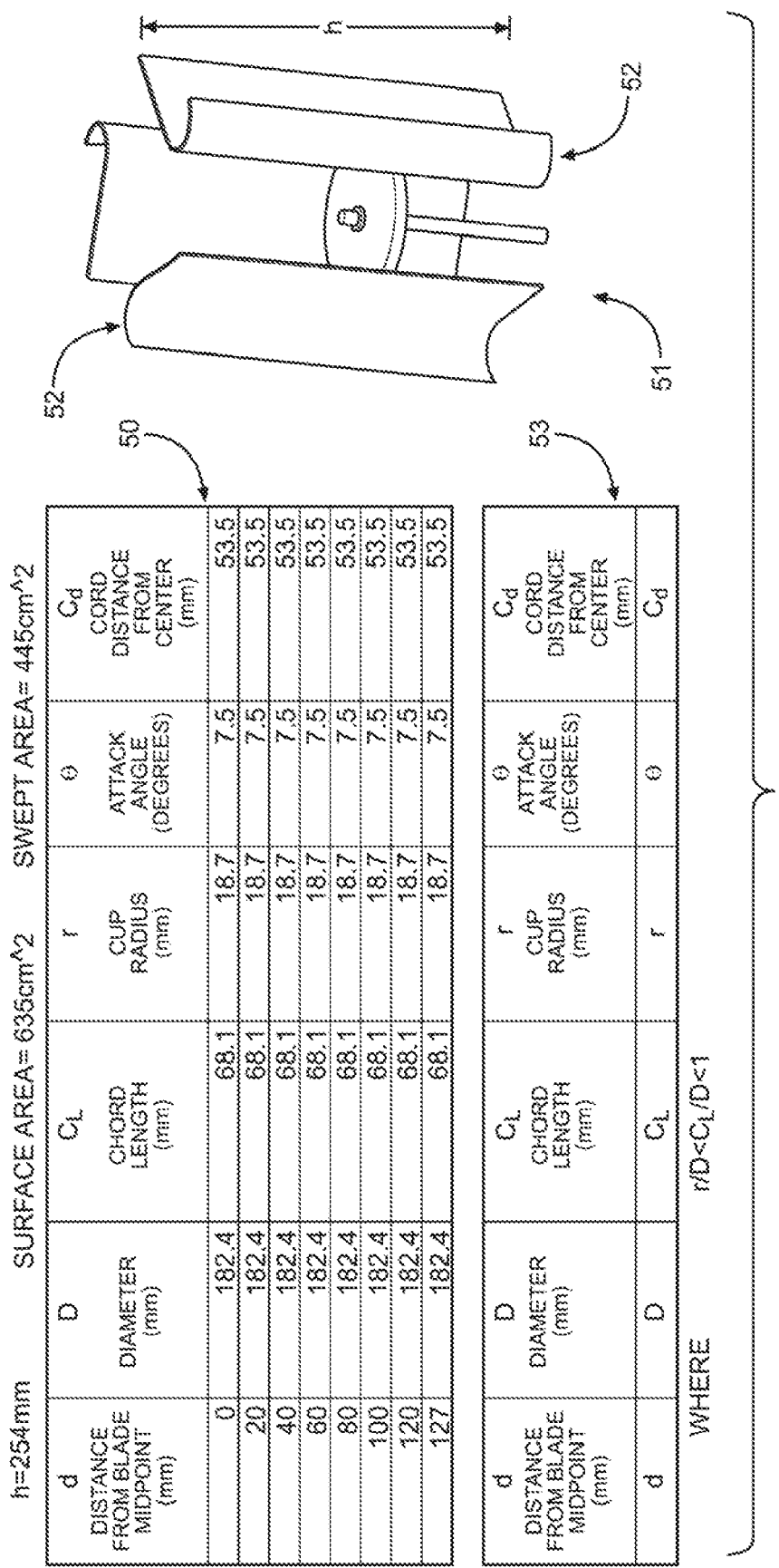
FIG. 8 shows a wind powered alternator with the simplified rotor as in FIG. 3 using traditional Lenz style blades together with a chart that details the blade parameters at elevations above and below the vertical midpoint of the blades.

FIG. 8 shows a wind powered alternator with the simplified rotor as in FIG. 3 but using traditional Lenz style blades (51). The height of the blade is given by h. The diameter D, chord length $C_L$, cup radius r, attack angle $\ominus$, and chord distance $C_d$ from center at the vertical midpoint of the blade are is as in FIG. 4 and obey the relationship: $r/D<C_L/D<1$. The chord distance $C_d$ and the attack angle $\ominus$ are constant. The chart (53) defines the blade parameters at a distance above and below the vertical midpoint of the blade for a generalized implementation of the design. The chart (50) details the blade parameters at elevations above and below the vertical midpoint of the blade in 20 mm increments for one particular embodiment of the invention where at the vertical midpoint of the blade: D=182.4 mm, $C_L$=68.1 mm, r=18.7 mm, $C_d$=53.5 mm, and $\ominus$=7.5 degrees. For this reference design, the blade parameters do not change with distance d from the vertical midpoint of the blade. The result is that the wingtips/blade tips (52) at the terminal bottom and top ends of each blade 51 has the same profile as the vertical center of the blade. The total surface area of each individual blade is also shown in the chart (50).

Figure 9:
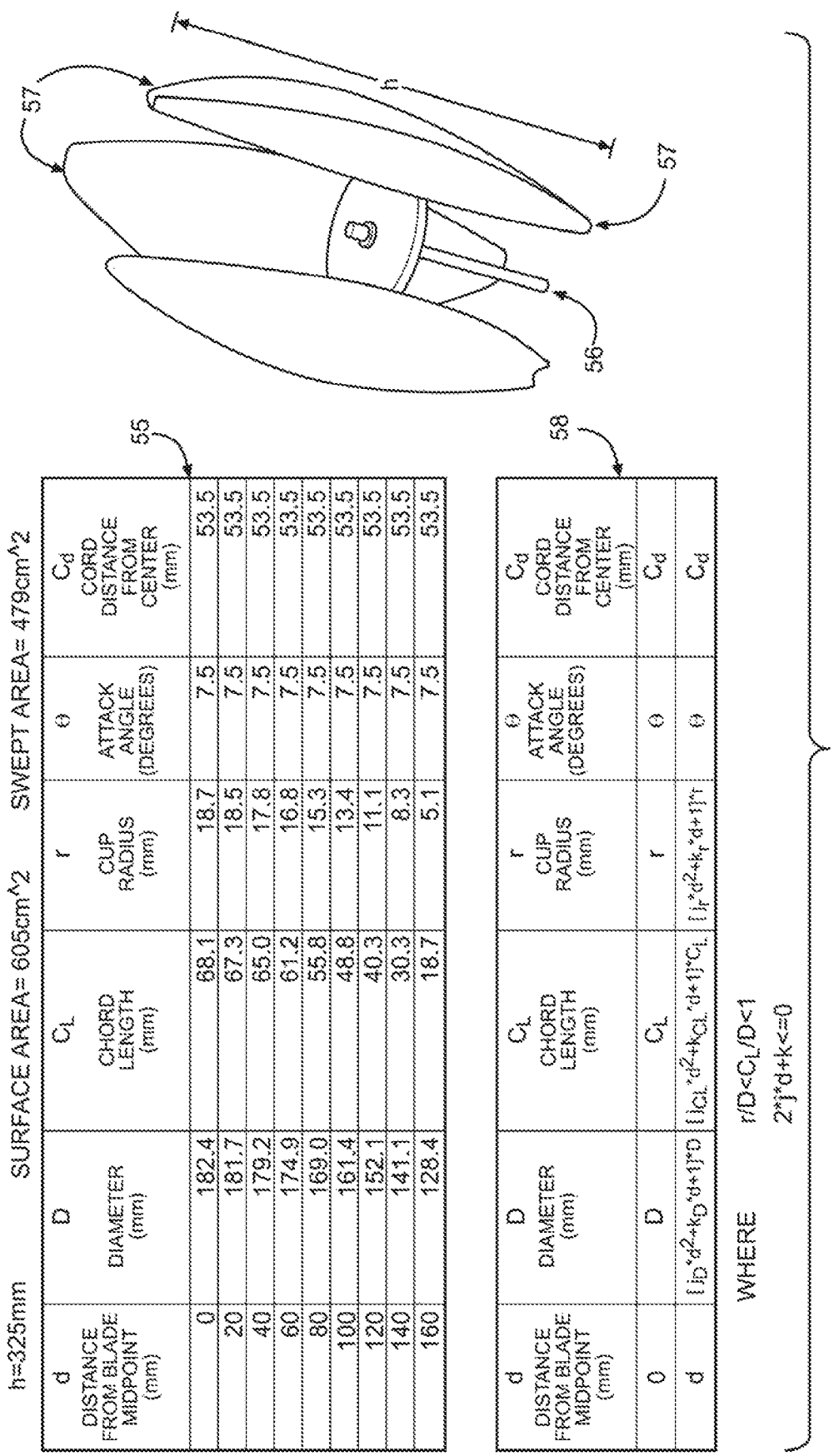
FIG. 9 shows a wind powered alternator with the simplified rotor as in FIG. 3 using one embodiment of the current invention together with a chart that details the blade parameters at elevations above and below the vertical midpoint of the blades.

FIG. 9 shows a wind powered alternator with the simplified rotor as in FIG. 3 using blades (56) constructed in accordance with the principles of the current invention. The height of the blades is also here defined by the letter h. The diameter D, chord length $C_L$, cup radius r, attack angle $\ominus$, and chord distance $C_d$ from center at the vertical midpoint of the blade are as in FIG. 4 and obey the relationship: $r/D<C_L/D<1$. The chord distance $C_d$ and the attack angle $\ominus$ are constant. However, the cup radius r and the chord length $C_L$ decrease as the distance from the vertical center of the blade increases. As shown, in this embodiment of the blades (56), the wingtips (57) at the terminal bottom and top ends of each blade (56) are substantially smaller than the wingtips (52) in FIG. 8. This results in a reduction of losses due to turbulence and also a reduction in noise due to turbulence. The chart (58) defines the blade parameters at a distance above and below the vertical midpoint of the blade for a generalized implementation of an embodiment of the invention. The chord length $C_L$ and the cup radius r at a distance d from the vertical center of the blade are given by two simple, second order polynomials. The coefficients $j_{CL}$ and $k_{CL}$ define the variation in chord length $C_L$ as d increases. Similarly, the coefficients $j_r$ and $k_r$ define the variation in cup radius r as d increases. D also varies with distance from the vertical center of the blade, but it is a dependent variable and is fully defined by the cup radius r and the cord distance $C_d$ from center at any particular distance d from the vertical center of the blade. However, it also can be described by a second order polynomial and its equation is included for completeness. To insure that the cup radius and cord length continuously decrease as d increases, the j and k coefficients in the table (58) must satisfy the following condition: $2*j*d+k<=0$.

As depicted in FIG. 9, the blade (56) is symmetrical above and below the vertical center of the blade. The curvature above and below the vertical center could also be different. If using a polynomial description of such blades, this would mean the coefficients above and below the vertical center of the blade would be different.

The chart (55) details the blade (56) parameters at elevations above and below the vertical midpoint of the blade in 20 mm increments where, at the vertical midpoint of the blade: D=182.4 mm, $C_L$=68.1 mm, r=18.7 mm, $C_d$=53.5 mm, and $\ominus$=7.5 degrees. These are the same parameters as in the chart (50) in FIG. 8 which means the center cross section for these two wind powered alternators would be the same. It also means that the startup properties will be similar since the distance of the blade from center is the same. The height h for blades (57) is chosen so that the surface area of each blade 57 in table (55) is roughly similar to the surface area of the blades (51) shown in the table (50) of FIG. 8. Therefore, the amount of material needed to make each blade is also generally similar. The design coefficients for the blade (57) in table (55) are: $j_{CL}$=−0.00725, $k_{CL}$=0, $j_r$=−0.00725, $k_r$=0.

Figure 10:
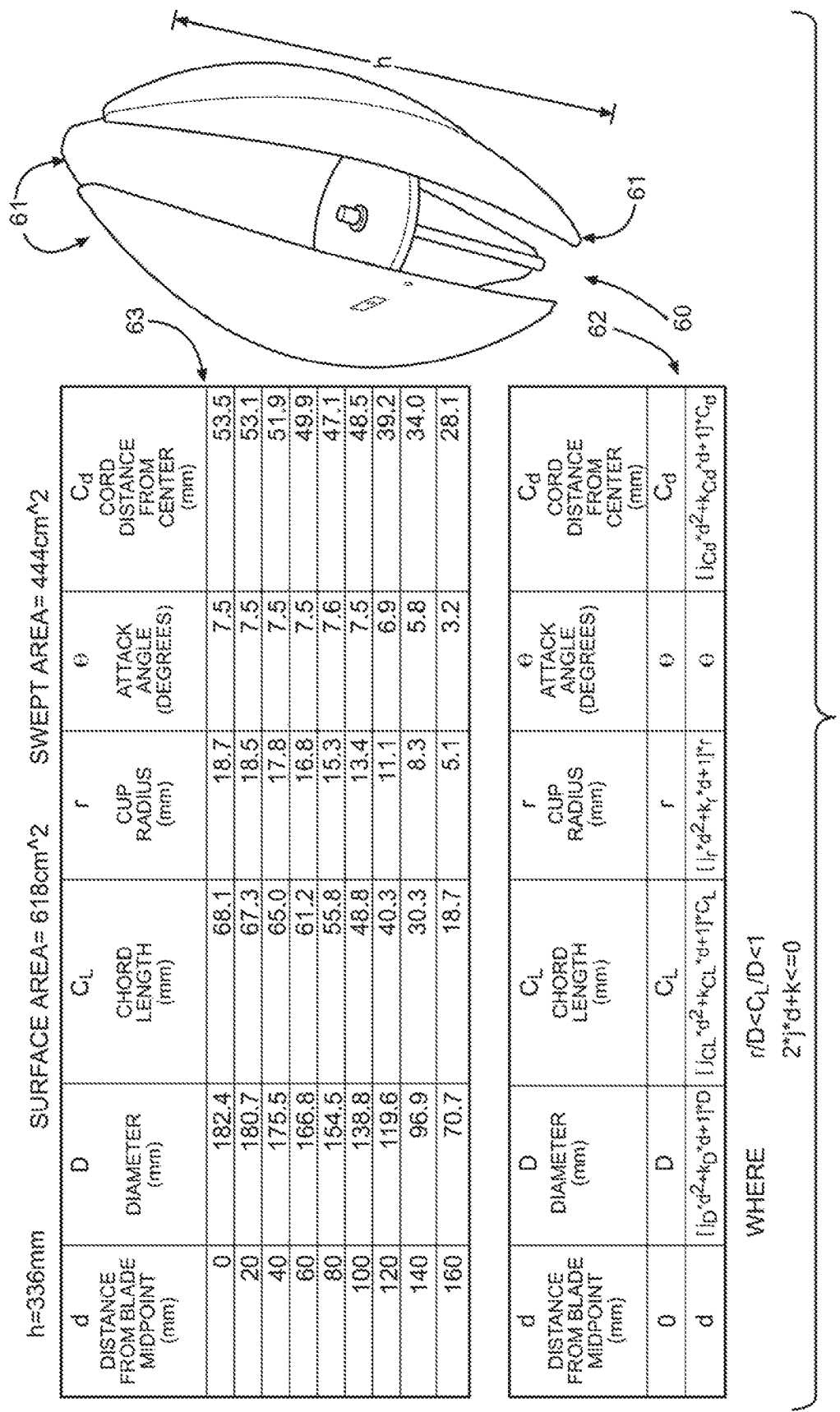
FIG. 10 shows a wind powered alternator with the simplified rotor as in FIG. 3 using a preferred embodiment of the current invention together with a chart that details the blade parameters at elevations above and below the vertical midpoint of the blades.

FIG. 10 shows a wind powered alternator with the simplified rotor as in FIG. 3 using blades (60) also constructed in accordance with the principles of the current invention. The height of the blades is also here defined by the letter h. The diameter D, chord length $C_L$, cup radius r, attack angle $\ominus$, and chord distance $C_d$ from center at the vertical midpoint of the blade are as in FIG. 4 and obey the relationship: $r/D<C_L/D<1$. However, in this embodiment the cup radius r, the chord length $C_L$, and the cord distance $C_L$ from center all decrease as the distance d from the vertical center of the blade increases. As shown, in this embodiment of the blades (60), the wingtips (61) at the terminal bottom and top ends of each blade are substantially smaller than the wingtips (52) in FIG. 8. This results in a reduction of losses due to turbulence and also a reduction in noise due to turbulence. Additionally, the wingtips (61) are also closer to the center of rotation which reduces their air speed due to rotation, further reducing turbulence and noise.

The chart (62) defines the blade (60) parameters at a distance d above and below the vertical midpoint of the blade (60) for the preferred embodiment of the invention. The chord length $C_L$, the cup radius r, and the cord distance $C_d$ from center at a distance d from the vertical center of the blade (60) are given by three simple, second order polynomials. The coefficients $j_{CL}$ and $k_{CL}$ define the variation in chord length $C_L$ as d increases. Similarly, the coefficients $j_r$ and $k_r$ define the variation in cup radius r as d increases. Similarly, the coefficients $j_{Cd}$ and $k_{Cd}$ define the variation in chord distance $C_d$ from center as d increases. D also varies with distance d from the vertical center of the blade, but it is a dependent variable and is fully defined by the cup radius r and the cord distance $C_d$ from center at any particular distance d from the vertical center of the blade. However, it also can be described by a second order polynomial and its equation is included for completeness. To insure that the cup radius r, cord length $C_L$, and cord distance $C_d$ from center continuously decrease as d increases, the j and k coefficients in the table (62) must satisfy the following condition: 2*j*d+k<=0. As shown in table (63), the attack angle ϴ also decrease near the tips (61) of the blades (60) which further reduces losses and noise due to turbulence.

As depicted in FIG. 10, the blade (60) is symmetrical above and below the vertical center of the blade. The curvature above and below the vertical center could also be different. If using a polynomial description of such blades (60), this would mean the coefficients above and below center would be different.

The chart (63) details the blade (60) parameters at elevations above and below the vertical midpoint of the blade in 20 mm increments where, at the vertical midpoint of the blade: D=182.4 mm, $C_L$=68.1 mm, r=18.7 mm, $C_d$=53.5 mm, and ϴ=7.5 degrees. These are the same parameters as in the chart (50) in FIG. 8 and chart (55) in FIG. 9 which means the center cross section for these three wind powered alternators would be the same. It also means that the startup properties will be similar since the distance of the blade from center is the same at the vertical center of the blade. However, since the distance of the cord $C_d$ from center decreases as d increases, it means portions of the blade (60) are closer to the center of rotation as compared to the blades in FIGS. 8 and 9. This results in higher angular velocities and more power generation at a given wind speed once the stationary moment of inertia and friction is overcome. The height h for blades (60) is chosen so that the surface area thereof, and hence each blade depicted in tables (50), (55), and (63), are roughly similar. Therefore, the amount of material needed to make each of these blades is also roughly similar. The design coefficients for the blade in table (63) are: $j_{CL}$=−0.00725, $k_{CL}$=0, $j_r$=−0.00725, $k_r$=0, $j_{C\ d}$=−0.00475, $k_{C\ d}$=0. The coefficients for the cord length $C_L$ and cup radius r are the same as those used in table (55) of FIG. 9. The result is that the blades (60) of FIG. 10 have a similar appearance to the blades (56) of FIG. 9, but curve inwards toward the center of rotation as the distance d from the vertical midpoint of the blade increases.

Samples of the blades described in tables (50), (55), and (63) were fabricated and their performance was compared in a wind tunnel at a wind speed of approximately 7 MPH. As in FIG. 6 and FIG. 7, RPM and power delivered to a load resistance were measured as the load resistance was increased and decreased. This data was then used to calculate a full-system power coefficient (Cp), which is the ratio of the power delivered to the load resistance to the total wind power flowing into the turbine blades, versus TSR. As those skilled in the art will understand, the power available (Pw) from the wind is directly proportional to the swept area (A) of the turbine blades and the wind speed (V) to the third power: Pw=B*(q*A*V^3)/2 where q is the air density and assumed to be 1.2 kg/m^3 for these discussions and B is the Betz limit. The swept areas for the three fabricated blade designs are included in tables (50), (55), and (63). TSR's were calculated at the maximum diameter of the wind turbine blades.

Figure 11:
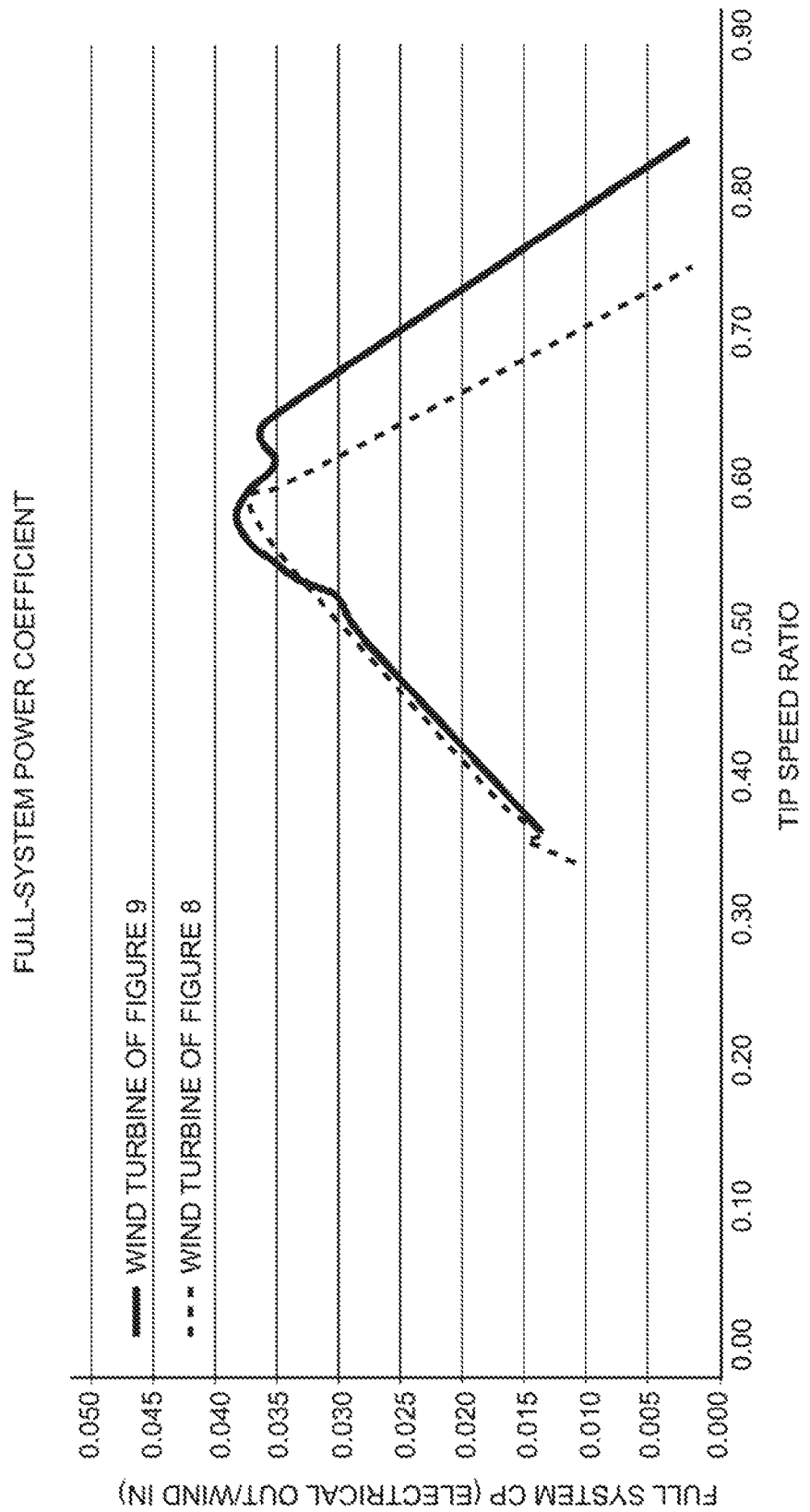
FIG. 11 is a graph comparing full-system power coefficient (Cp) versus tip speed ratio (TSR) for the embodiment of the invention shown in FIG. 9 versus the blades shown in FIG. 8.

FIG. 11 is a graph comparing Cp versus TSR for the embodiment of the invention shown in FIG. 9 versus the blades shown in FIG. 8. All measurements were made using the same alternator and at the same wind speed. Measurements were made starting with the load resistance open to achieve maximum RPM and then the load resistance was decreased down to 50 ohms. Decreasing the load resistance from a high impedance to a low impedance insures the operating point is always on the higher side of the hysteresis curve. As can be seen in FIG. 11, the maximum Cp for the two blades is similar, but the peak is wider for the blade as in FIG. 9. For any given TSR, the Cp for the blades of FIG. 9 is either similar to or greater than the Cp for the blades of FIG. 8. In a typical application, wind speed will vary from moment to moment and the inertia of the wind powered alternator will cause the TSR to vary also. A wider Cp versus TSR curve will perform better under these conditions so, for a similar amount of material, the blades of FIG. 9 will outperform the blades of FIG. 8 in most applications.

Figure 12:
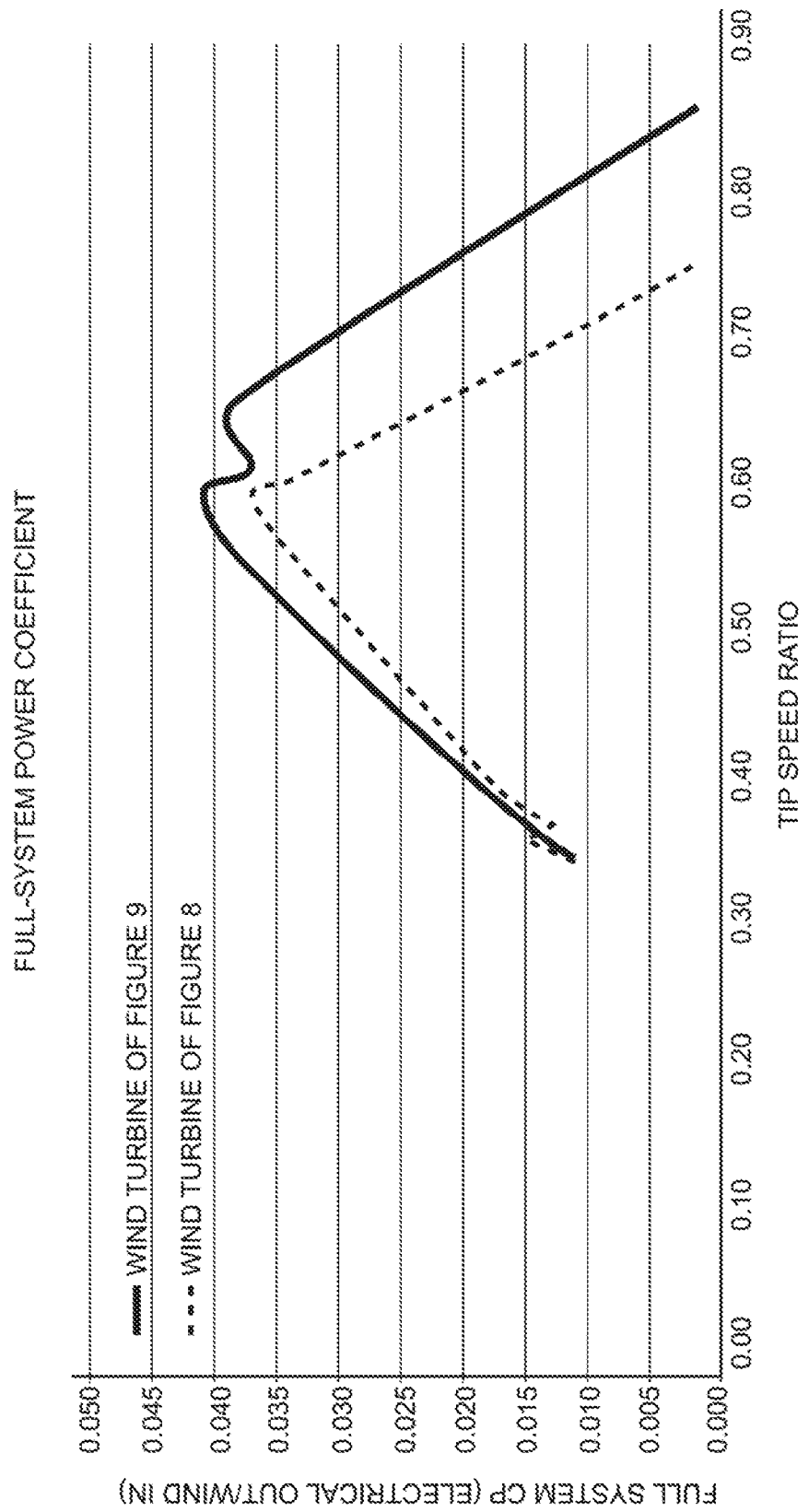
FIG. 12 is a graph comparing Cp versus TSR for the embodiment of the invention shown in FIG. 10 versus the blades shown in FIG. 8.

FIG. 12 is a graph comparing Cp versus TSR for the embodiment of the invention shown in FIG. 10 versus the blades shown in FIG. 8. All measurements were made using the same alternator and at the same wind speed. Measurements were made starting with the load resistance open to achieve maximum RPM and then the load resistance was decreased down to 60 ohms. As can be seen in FIG. 12, the maximum Cp for the blades of FIG. 10 is always higher than the Cp for the blades of FIG. 8. The curve for the blades of FIG. 10 is also wider. As discussed above, for a similar amount of material, the blades of FIG. 10 will outperform the blades of FIG. 8 in most applications.

Figure 13:
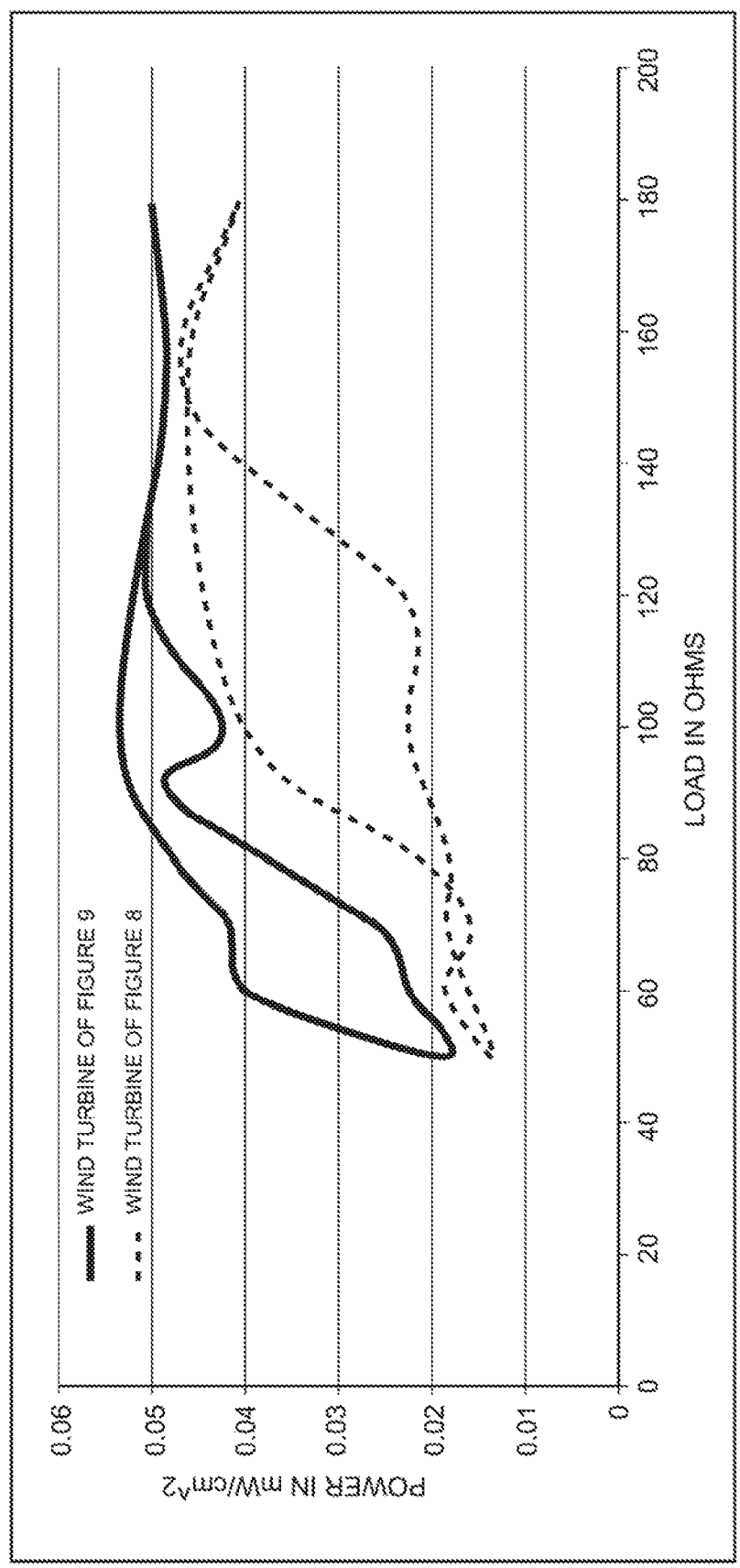
FIG. 13 shows the output power of the blades shown in FIG. 8 compared to the blades shown in FIG. 9 versus load resistance.

FIG. 13 shows the output power of the blades shown in FIG. 8 compared to the blades shown in FIG. 9 versus load resistance. As discussed previously for FIG. 7, both blades show regions where for the same load resistance there are two possible output powers where the higher power can be achieved when the blade is 'making its own wind'. As can be seen in FIG. 13, the blades as shown in FIG. 9 outperform the blades shown in FIG. 8.

Figure 14:
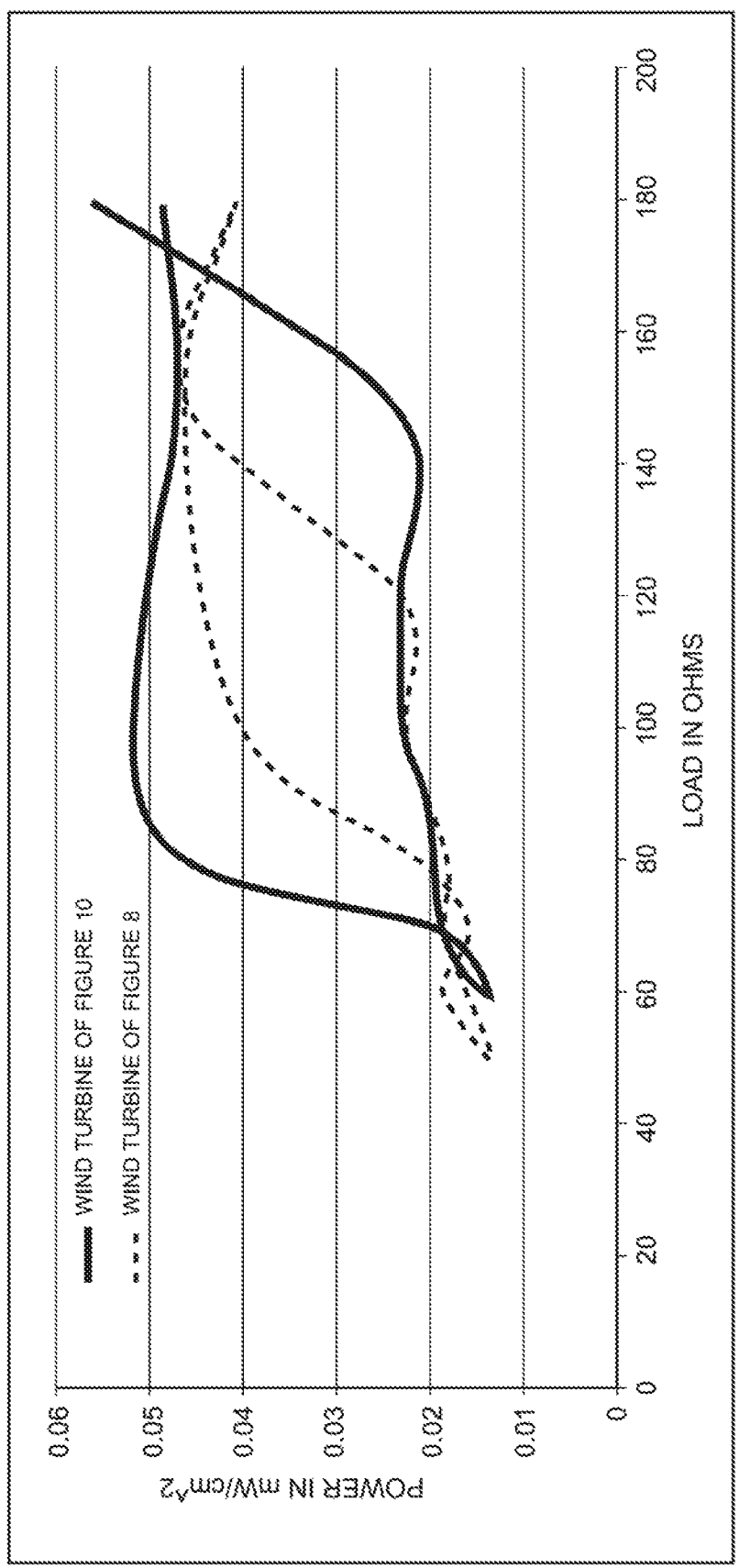
FIG. 14 shows the output power of the blades shown in FIG. 8 compared to the blades shown in FIG. 10 versus load resistance.

FIG. 14 shows the output power of the blades shown in FIG. 8 compared to the blades shown in FIG. 10 versus load resistance. As discussed previously for FIG. 7, both blades show regions where for the same load resistance there are two possible output powers where the higher power can be achieved when the blades are 'making its own wind'. It can be seen in FIG. 14 that the blades as shown in FIG. 10 outperform the blades shown in FIG. 8 only when they are on the upper curve where they are 'making their own wind'. If on the lower curve the blades from FIG. 10 underperform the blades shown in FIG. 8. To optimize performance when using the blades as shown in FIG. 10, it is important to make sure the operating point is on the upper curve whenever possible.

Figure 15:
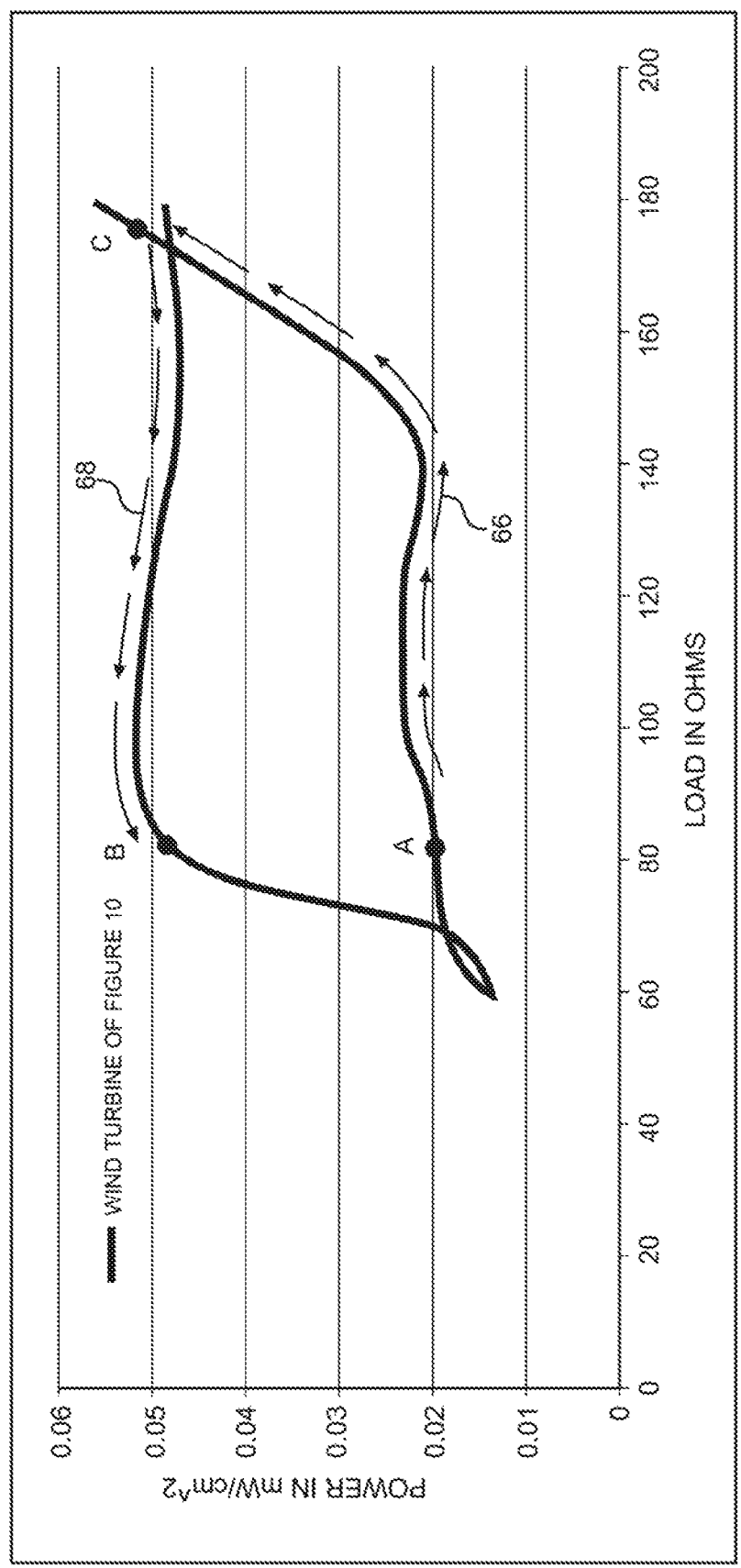
FIG. 15 repeats the power versus load impedance curve for the blades as shown in FIG. 10 and illustrates a method to maintain the optimum operating point.

FIG. 15 repeats the power versus load impedance curve for the blades as shown in FIG. 10 and illustrates a method to maintain the optimum operating point. Assume an 80 ohm load impedance and that the wind powered alternator is operating at point A. There is a higher operating point available at point B. The higher operating point can be reached by increasing the load impedance to more than 170 ohms which will move the operating point along the lower curve as illustrated by trajectory (66) to operating point C. At this point the wind powered alternator is making its own wind and the load impedance can be reduced back to 80 ohms. The operating point will follow the trajectory illustrated by the trajectory (68) to the optimal operating point B.

Figure 16:
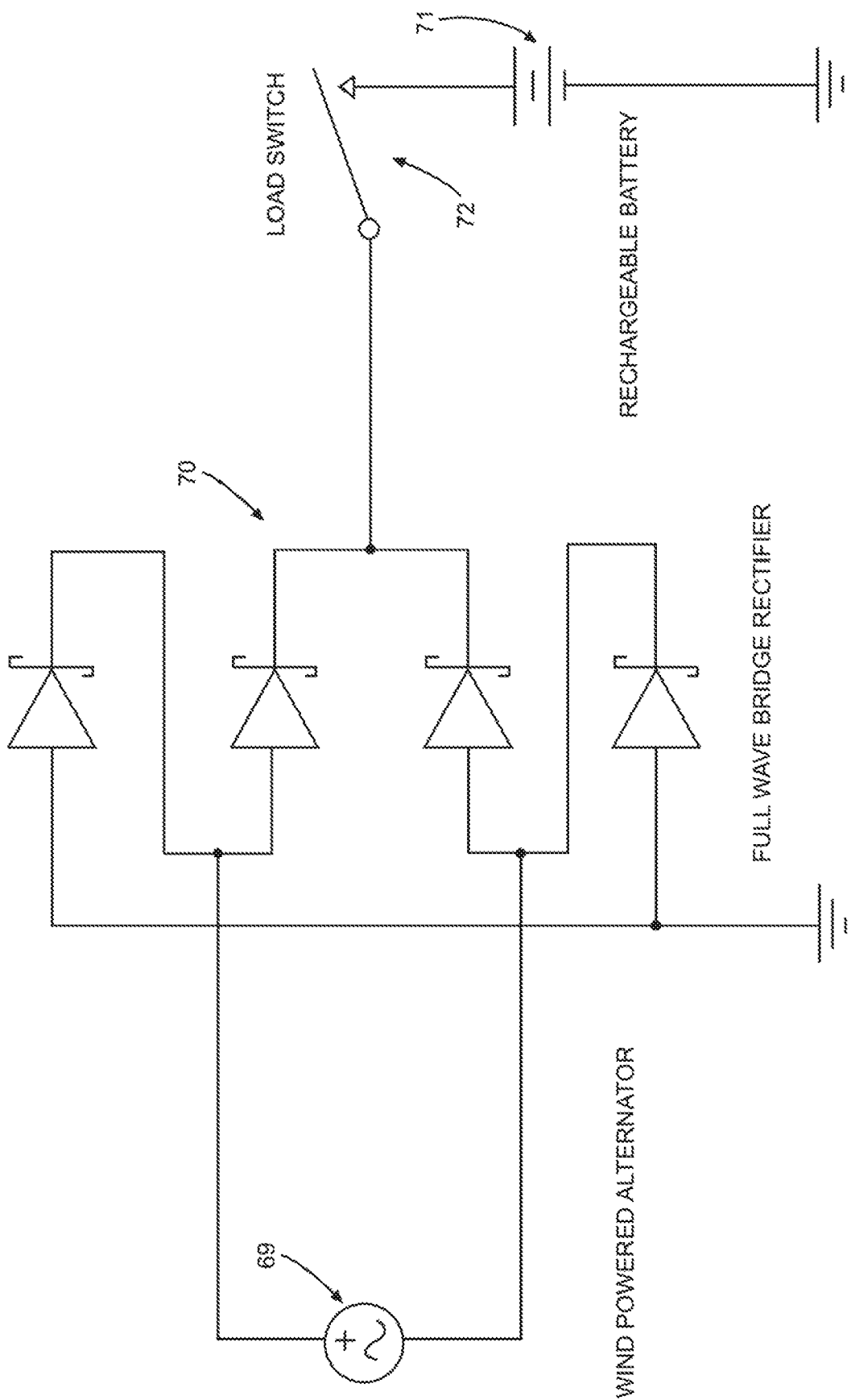
FIG. 16 is a simplified schematic illustrating the use of a wind powered alternator to charge a rechargeable battery.

FIG. 16 is a simplified schematic illustrating the use of a wind powered alternator (69) constructed in accordance with the principles of the present invention to charge a rechargeable battery (71). As those familiar with the art with understand, a full wave bridge rectifier (70) converts the alternating current from the wind powered alternator (69) to a DC current that can be used to charge the battery (71). Control logic (not shown) can connect or disconnect the battery (71), such as with a load switch (72), in order to optimize the power delivered to the battery. When it is determined by the control logic that the operating point is on the lower of two possible operating points (e.g. point A of FIG. 15), the load switch (72) is opened. Without the load connected, the load impedance is high and the alternator RPM will increase (e.g. along trajectory 66 of FIG. 15). When the RPM increases enough that the wind powered alternator is making its own wind (e.g. point C of FIG. 15), the load is reconnected and the operating point will move (e.g. along trajectory 68 of FIG. 15) to the higher of the two possible operating points (e.g. point B of FIG. 15). While the load switch (72) has disconnected the battery (71), no power is delivered to the battery. It is, therefore, necessary to make sure that the power gained by moving to the higher operating point is not offset by the power lost while the battery (71) is disconnected. When the battery (71) is disconnected, the RPM of the alternator will start to increase. While RPM is increasing, the momentum of the alternator also increases. This increased momentum represents potential energy that can be recovered when the battery (71) is reconnected. As long as the RPM is increasing while the switch (72) is open, there is little loss in the total energy that can be collected. However, if the switch (72) is open long enough, at any given wind speed, the RPM will reach a maximum value and stop increasing. The momentum will also stop increasing, so there is no further increase in the potential energy available. Therefore, if the switch (72) is left open long enough that the alternator RPM stops increasing, the power available from the wind will be lost and the full power system coefficient will decrease. One method to avoid this loss is for the control circuit to monitor the RPM while the switch (72) is open and reconnect the battery as soon as the RPM stops increasing. An alternate method is to open the switch (72) periodically for a period of time that is less than three of the alternator's mechanical time constant. At this time the RPM will have reached 95% of its maximum value. The battery should be disconnected often enough to follow the expected variations in the wind. For the preferred embodiment of the invention, the battery is disconnected for 3 seconds every 21 seconds.

Referring again to FIG. 16, those skilled in the art will recognize that when the peak voltage output of the alternator (69) is less than the battery voltage, the bridge rectifier (70) will stop conducting and thus effectively disconnect the battery (71). This unloads the alternator (69) and allows it to spin freely in winds that are too light to generate enough power to charge the battery (71) thus providing a pleasing visual effect when not generating power.

Figure 17A:
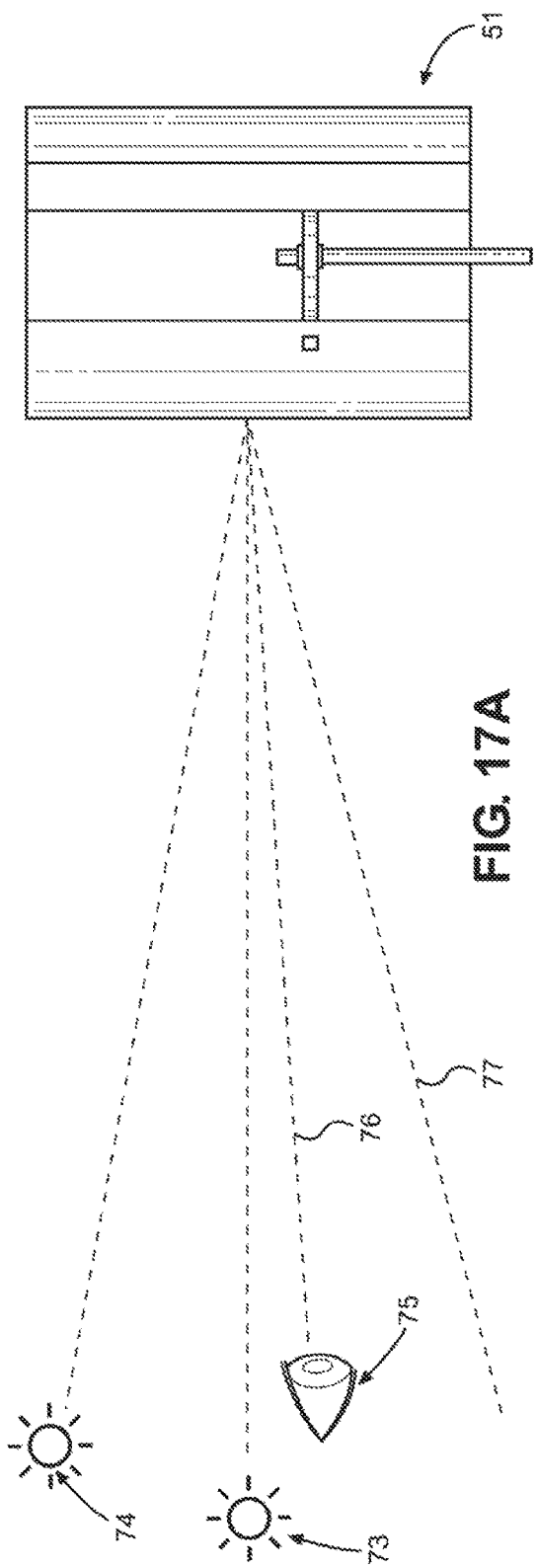
FIG. 17*a* illustrates the specular reflection of a traditional Lenz style blades turbine.
Figure 17B:
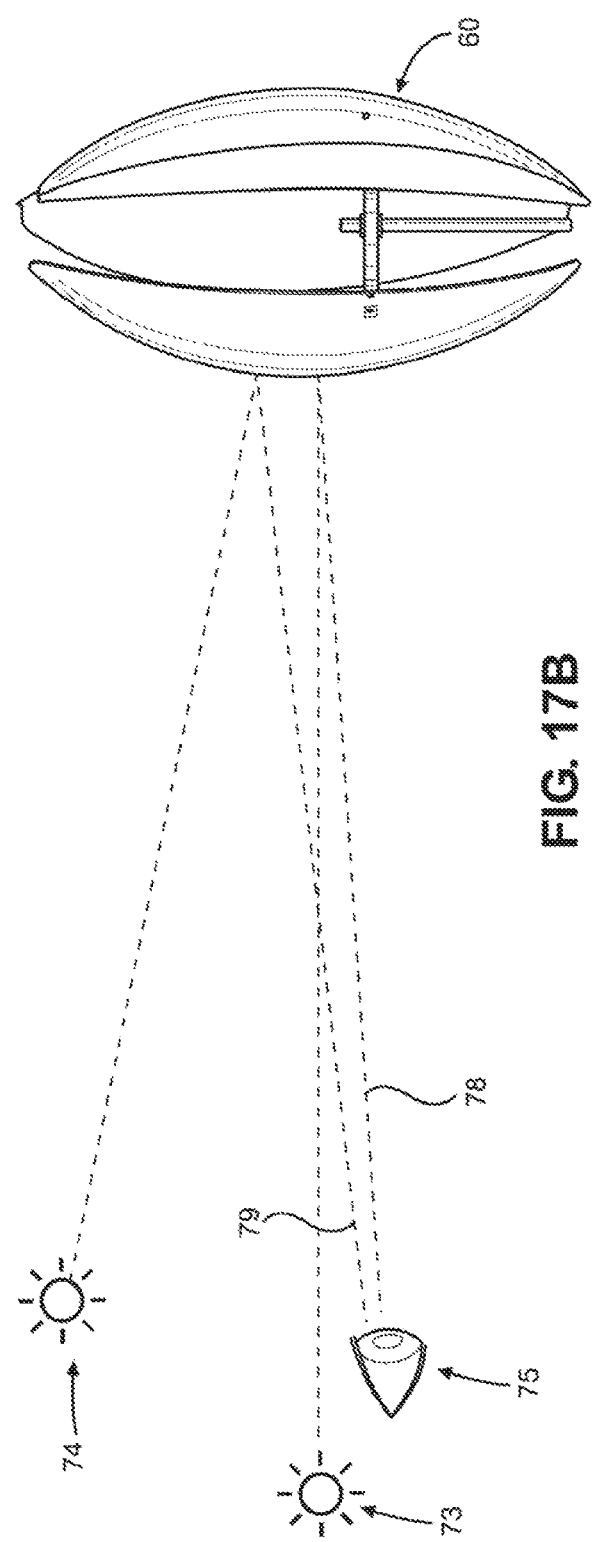
FIG. 17*b* illustrates the improved specular reflection of the preferred embodiment of the invention.

FIGS. 17a and 17b illustrate another advantage of the preferred embodiment of the invention. If the blades are made from a shiny material, there will be specular reflection. It is desirable that this reflected light directly reflect to the eye (75) of an observer from as many elevations of the light source as possible. In FIG. 17a, it can be seen that when the sun is at a low elevation (73), sunlight will reflect from the blades of the wind powered alternator (51) directly back to the eye (75) of an observer as illustrated by ray (76). However, if the sun is at a higher elevation (74), the reflected ray (77) misses the observer's eye (75). In the preferred embodiment of the invention shown in FIG. 17b, when the sun is at a low elevation it reflects from the blades of wind powered alternator (60) directly back the observer's eye (75) as illustrated by ray (78), and it also reflects directly back to the observers eye (75) when the sun is at a higher elevation (74) as illustrated by ray (79).

Referring now to FIG. 1, the blades (1), (2), and (3) are attached to the rotor (5) below the vertical midpoint of the blades at location (80). At high RPM, there will be centripetal forces on the blades away from the center of rotation. As the distance from mounting location (80) to the top of the blades is longer than the distance to the bottom of the blades, the net torque on the blades about location (80) will tend to spread the blade tips at the top of the blades and compress the blade tips at the bottom of the blades. Having the blade mount at a location (80) below the vertical center of the blades means that only one stabilizer (47) is required since stopping the blade tips from compressing at the bottom of the blades will also keep the blade tips at the top of the blades from spreading as long as the blades are strong enough not to bend at high RPM.

Figure 18:
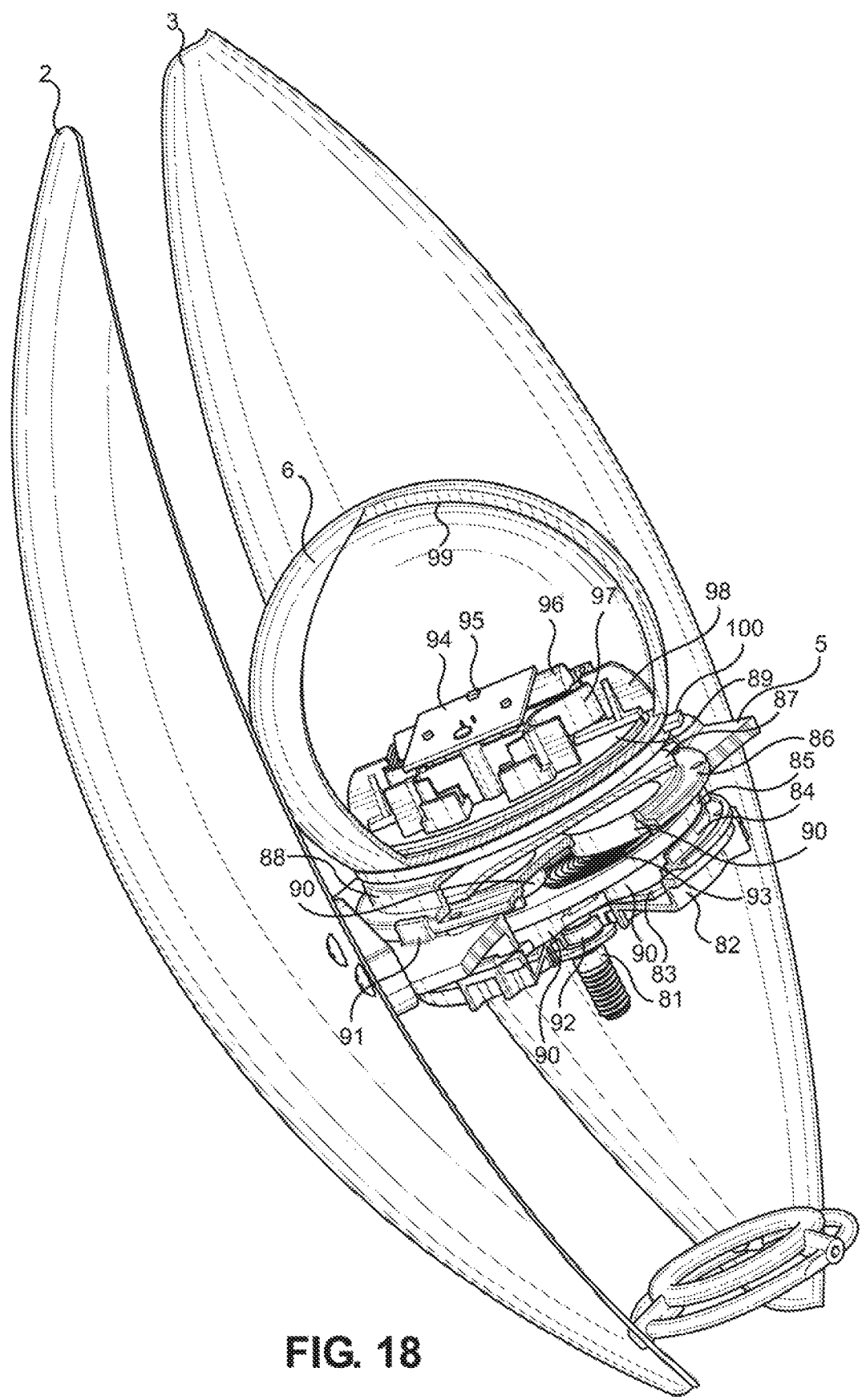
FIG. 18 shows a cut-away view of the preferred embodiment of FIG. 1.

FIG. 18 shows a cutaway view of the preferred embodiment of the invention shown in FIG. 1 with blade (1) removed. A threaded shaft (81) passes through a bottom cover (82), a lower flux plate (83), a lower magnet holder (84), a stator (85), an upper magnet holder (86), an upper flux plate (87) and an upper cover (88). The threaded portion of shaft (81) attaches to a mounting stake (46). Each magnet holder (84), (86) has openings to retain 4 magnets (90). A locating tab (91) on the top side of rotor (5) engages a slot in upper magnet holder (86). A similar tab (not shown) on the lower side of rotor (5) engages a slot in lower magnet holder (84) to ensure that the magnets in the upper magnet holder (86) are directly above the magnets in the lower magnet holder (84). Upper and lower flux plates (83) (87) are made from a ferromagnetic material, preferably steel, and are in direct contact with magnets (90) so as to concentrate the magnet fields lines and maximize the magnetic field strength in the gap between each of the vertically aligned magnet pairs. Shaft (81) is coupled to bottom cover (82) by bearing (92). A similar bearing (92) (shown in FIG. 19) couples the shaft (81) to the upper cover (88). The upper and lower covers (88), (82) capture the magnet holders (86), (84) and attach them to rotor (5). As such, the rotor (5) is free to rotate around shaft (81) which causes the magnets (90) to also rotate around the shaft (81). The stator (85) is fixed to shaft (81) which does not rotate. Four coils (93) of copper wire are attached to stator (85) and so are also stationary. As the rotor (5) rotates, the magnets (90) rotate past the coils (93) and induce a current in each coil. The coils (93) are connected in series and are connected to circuit board (94) thus supplying power to operate LED (95) and to charge battery (96). In the preferred embodiment, the coils (93) are preferably 470 turns of #30 PN bond #1 MW29-C wire with a 29 mm diameter and 3 mm thickness. The magnets (90) are preferably 25 mm×6.3 mm grade 5 ceramic magnets.

Figure 19:
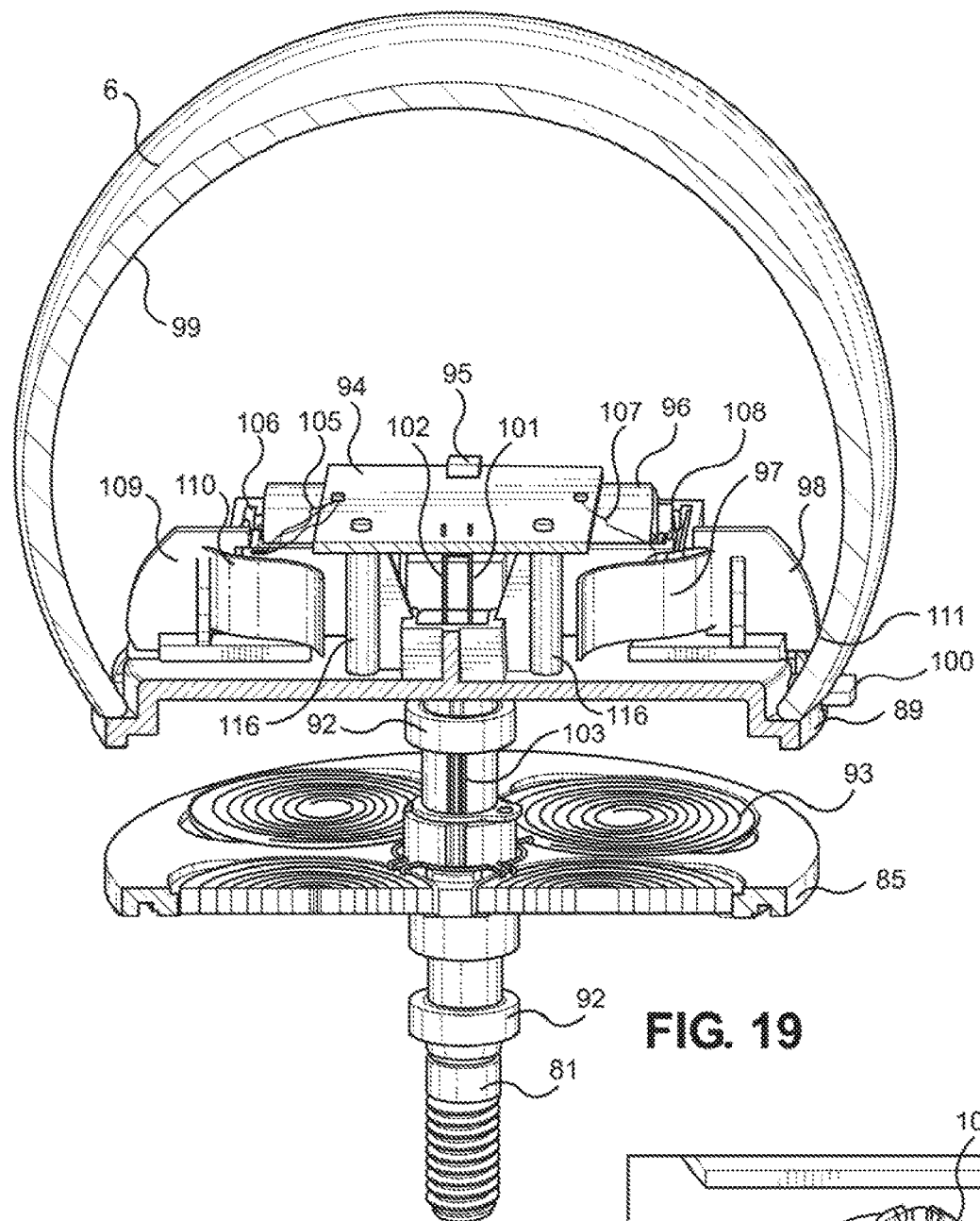
FIG. 19 shows a cross section view of the stationary parts of the preferred embodiment of FIG. 1.
Figure 19B:
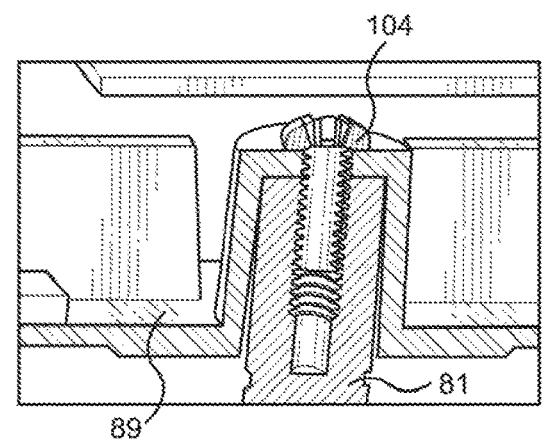
FIG. 19*b* shows a cross section of ornament platform connection to the top of the alternator shaft.
Figure 20:
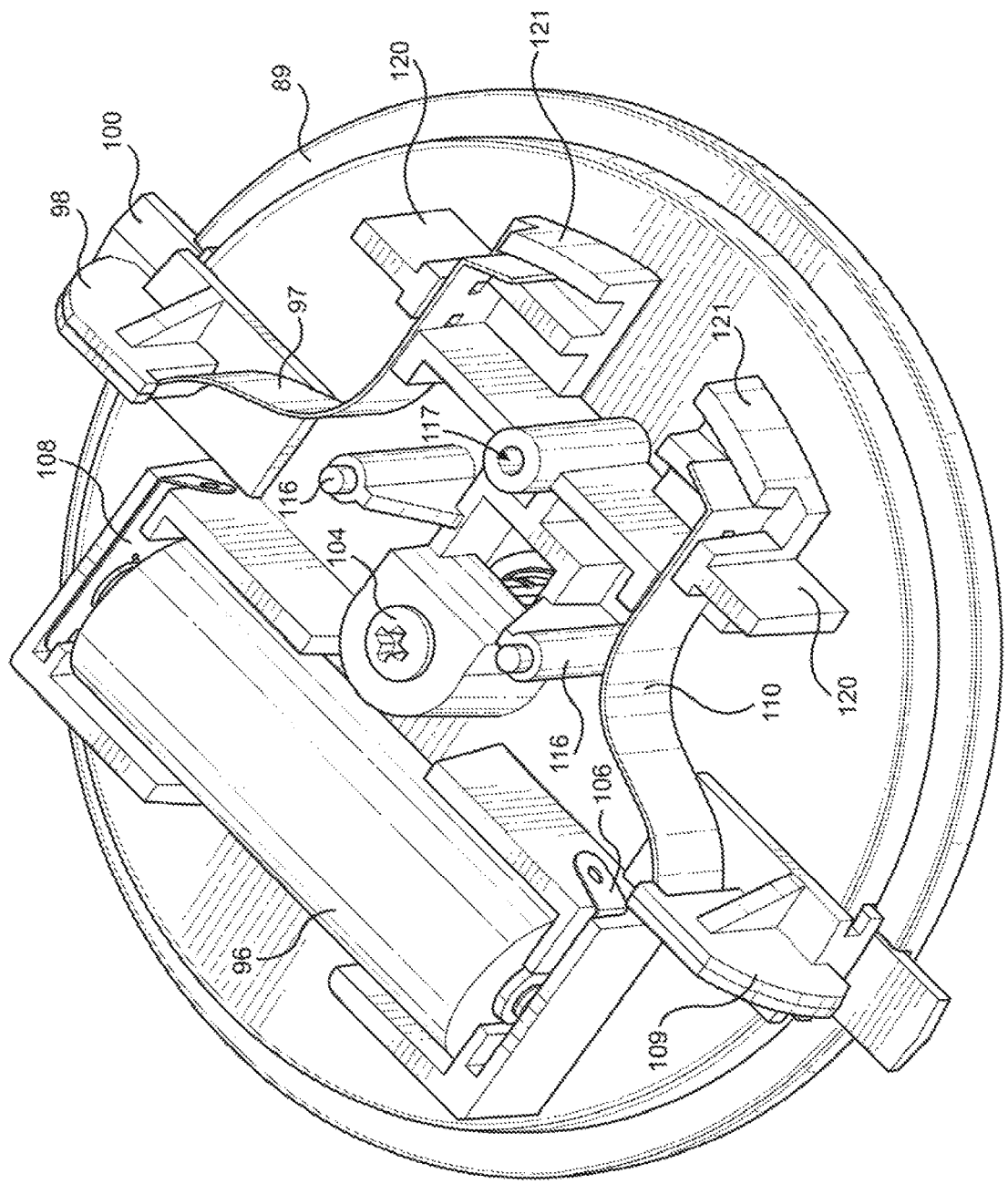
FIG. 20 is an upper view of the ornament mounting assembly with the decorative ornament and the printed circuit board (PCB) removed.
Figure 21:
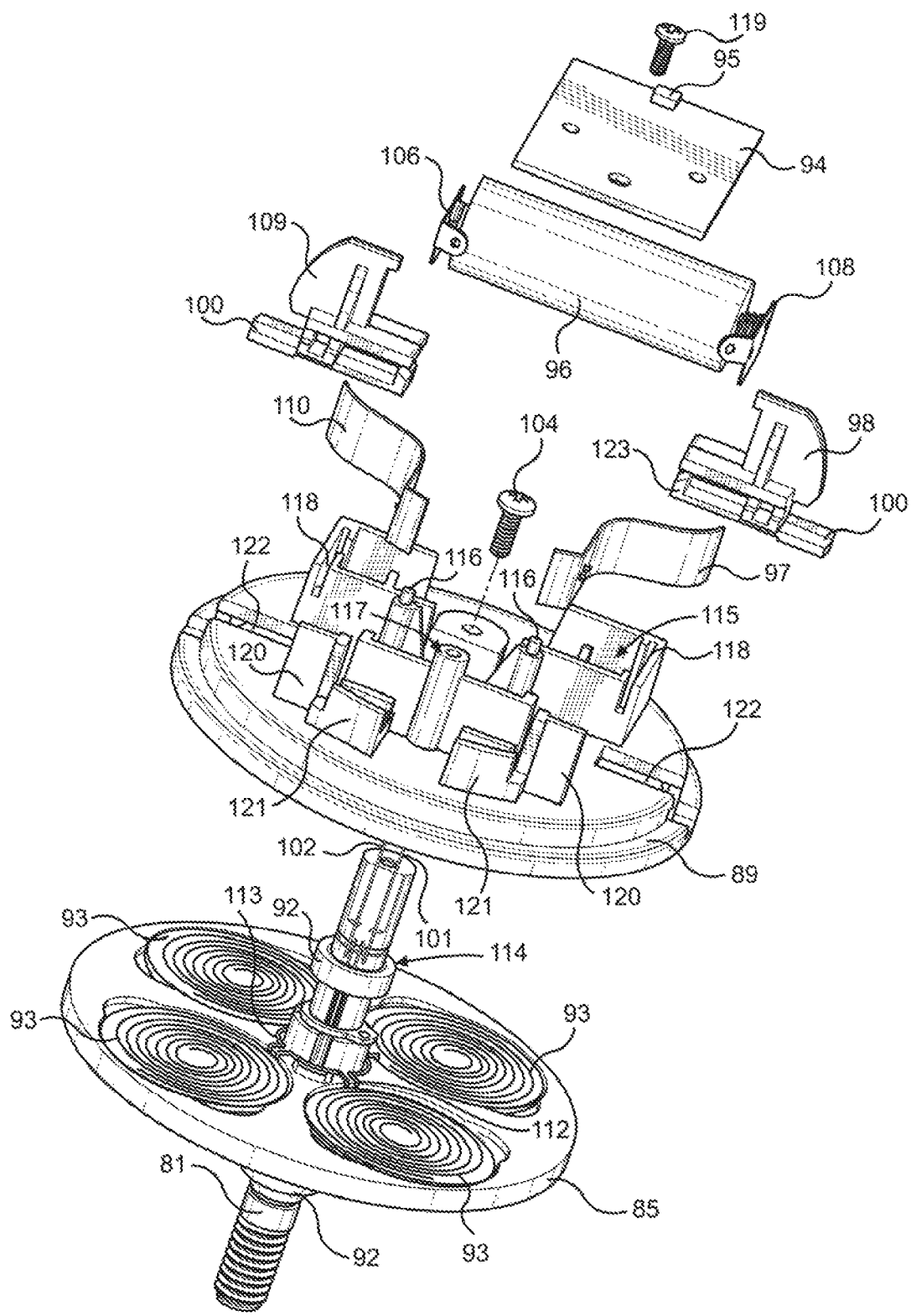
FIG. 21 is an exploded view of the stationary parts of the preferred embodiment of FIG. 1.
Figure 22:
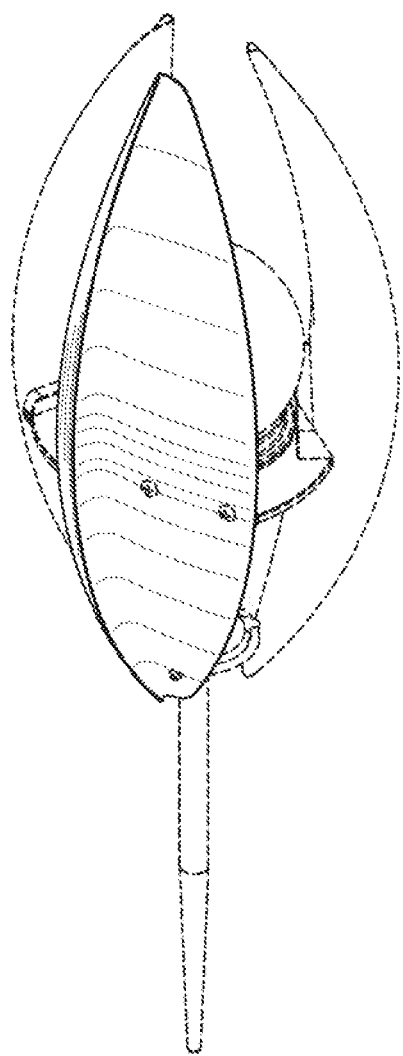
FIG. 22 is a perspective view of a wind turbine blade embodying the new design along with additional wind turbine blades on a vertical axis wind turbine and powering the centrally located globe light.
Figure 23:
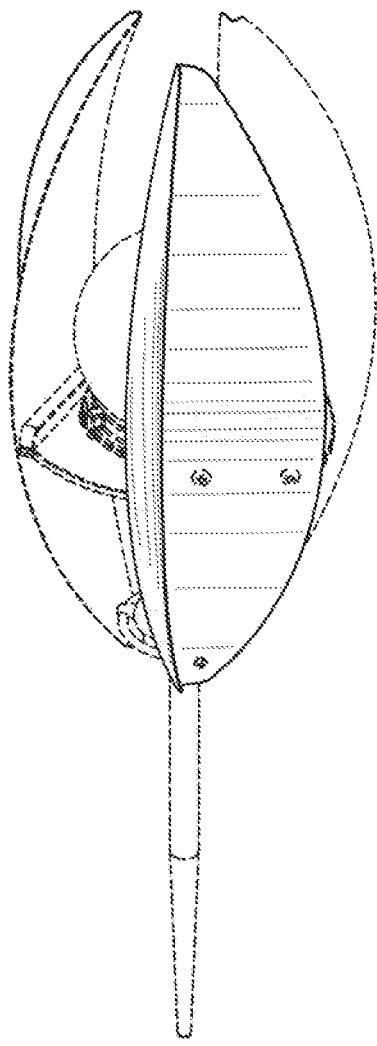
FIG. 23 is another perspective view of the wind turbine blade shown in FIG. 1 but wherein the blade is shown rotated about the vertical axis wind turbine to a different position from the position shown in FIG. 22.
Figure 24:
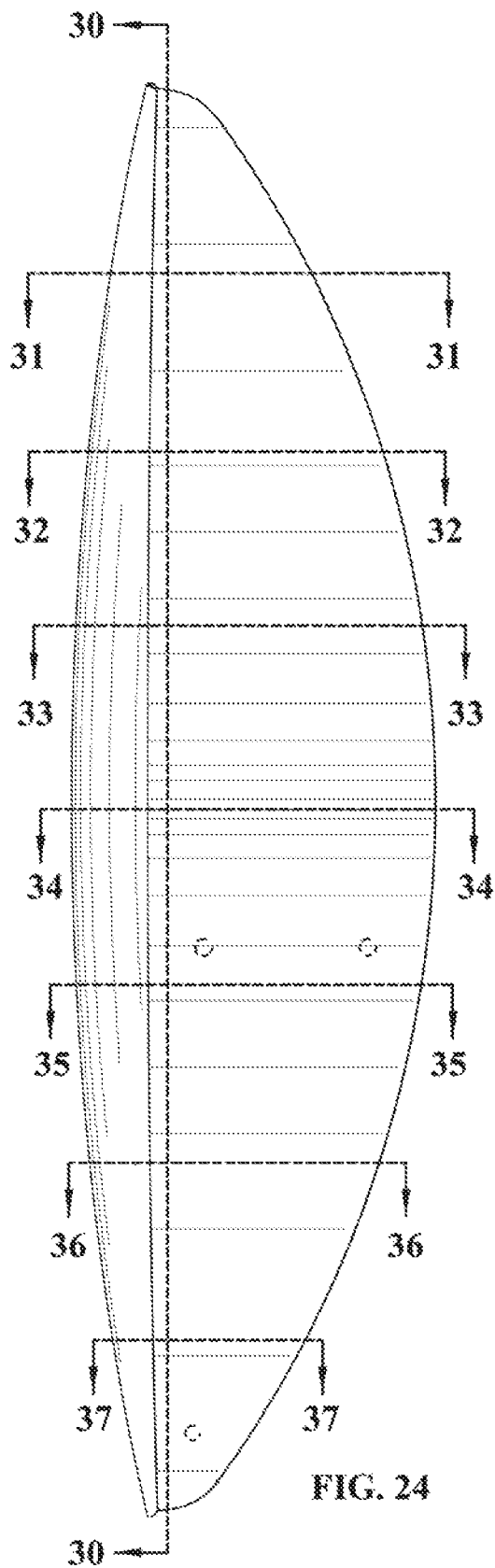
FIG. 24 is a front elevation view of the wind turbine blade shown in FIG. 22.
Figure 25:
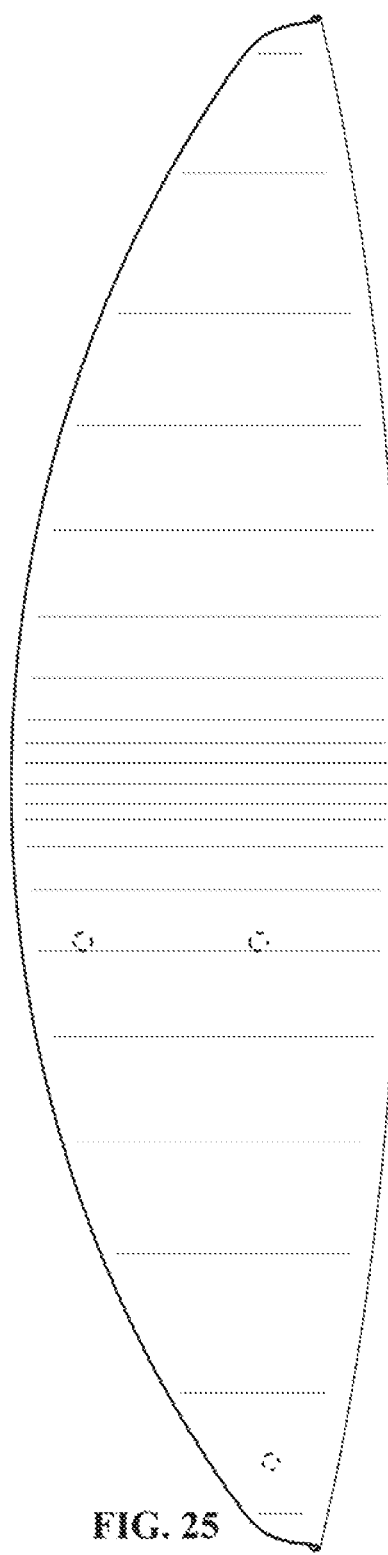
FIG. 25 is a rear elevation view of the wind turbine blade in FIG. 22.
Figure 26:
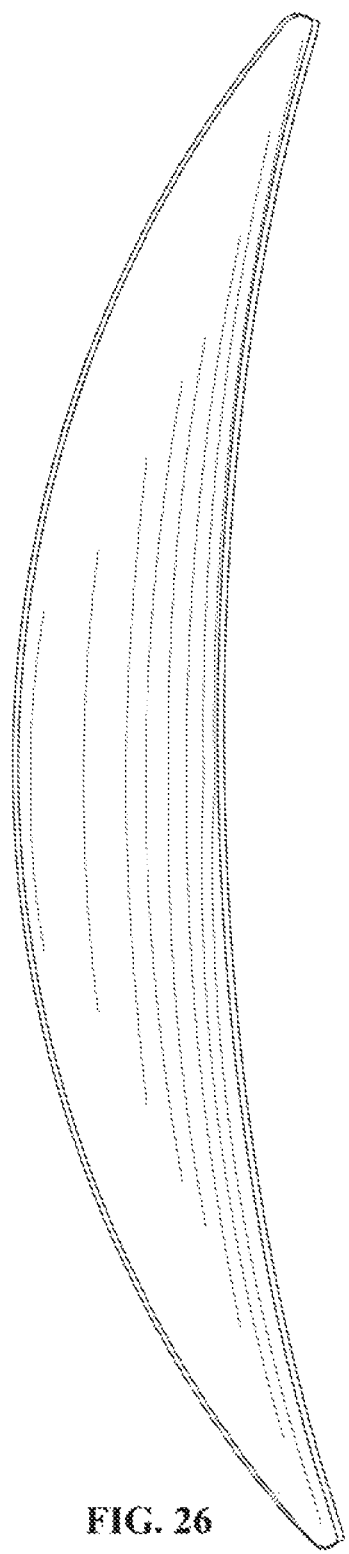
FIG. 26 is a right side elevation view of wind turbine blade shown in FIG. 22.
Figure 27:
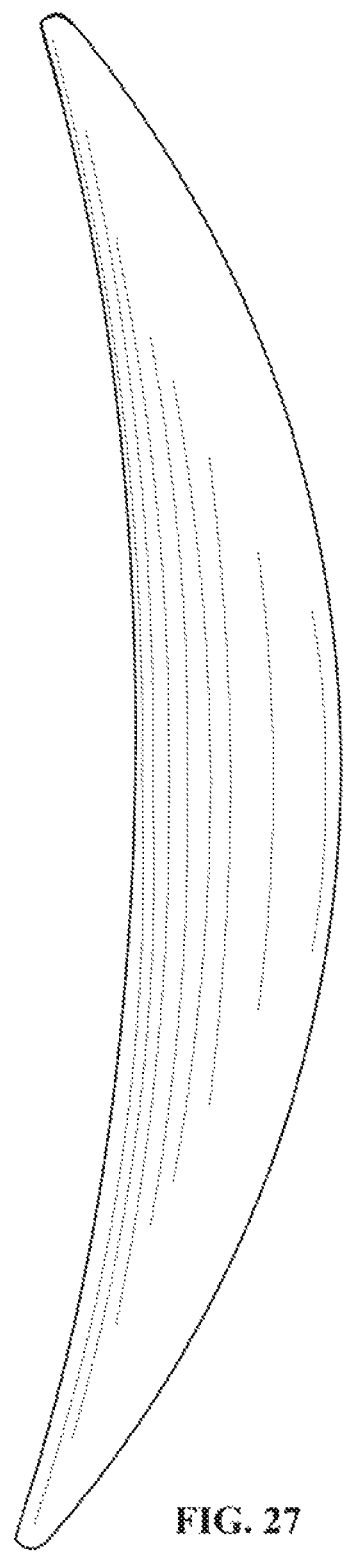
FIG. 27 is a left side elevation view of the wind turbine blade shown in FIG. 22.
Figure 28:
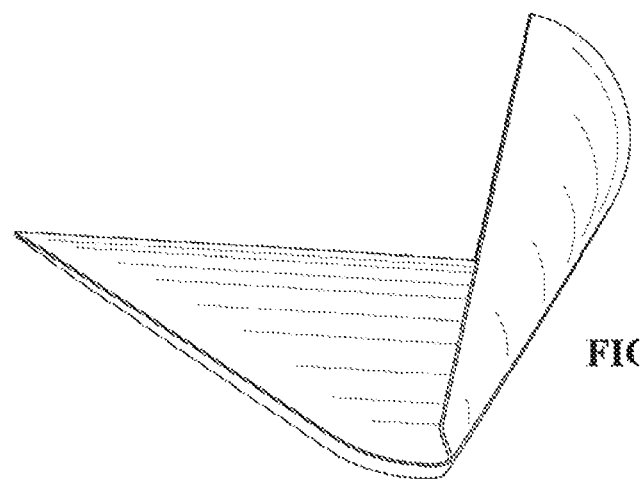
FIG. 28 is top plan view of the wind turbine blade shown in FIG. 22.
Figure 29:
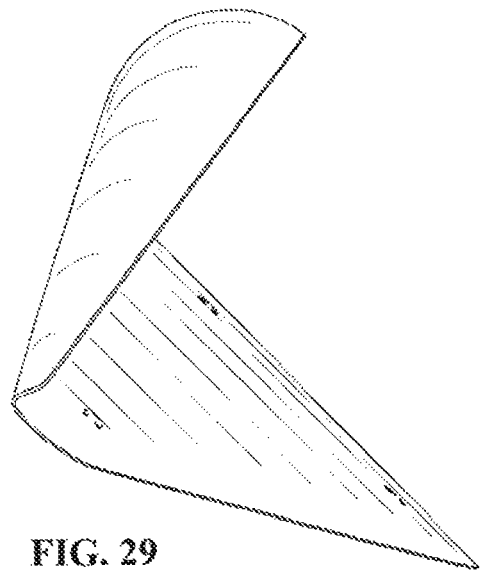
FIG. 29 is a bottom plan view of the wind turbine blade shown in FIG. 22.
Figure 30:
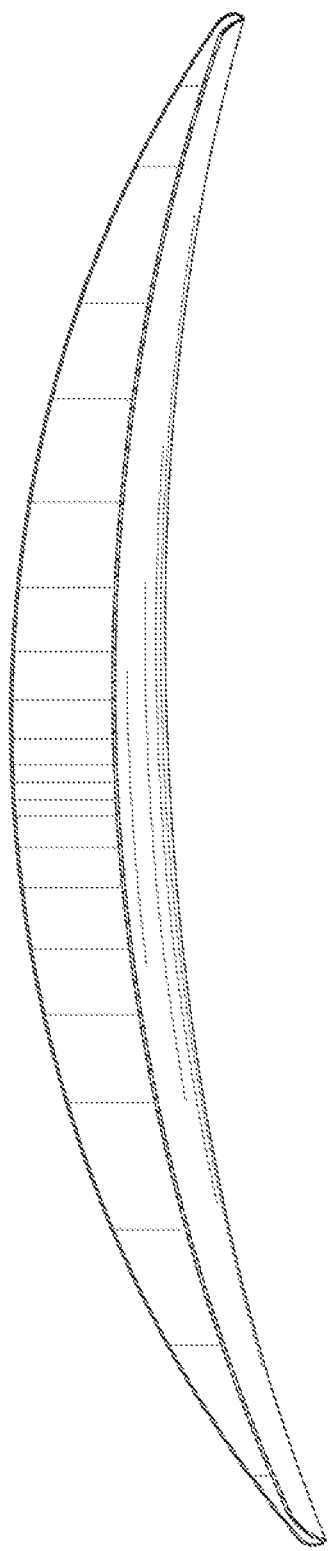
FIG. 30 is a cross section view taken along line 30-30 of FIG. 24.
Figure 31:
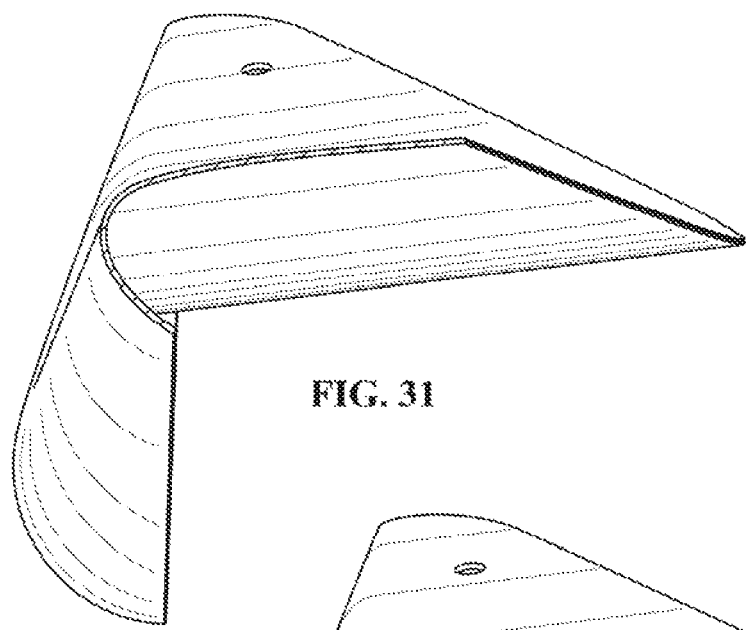
FIG. 31 is a cross section view taken along line 31-31 of FIG. 24.
Figure 32:
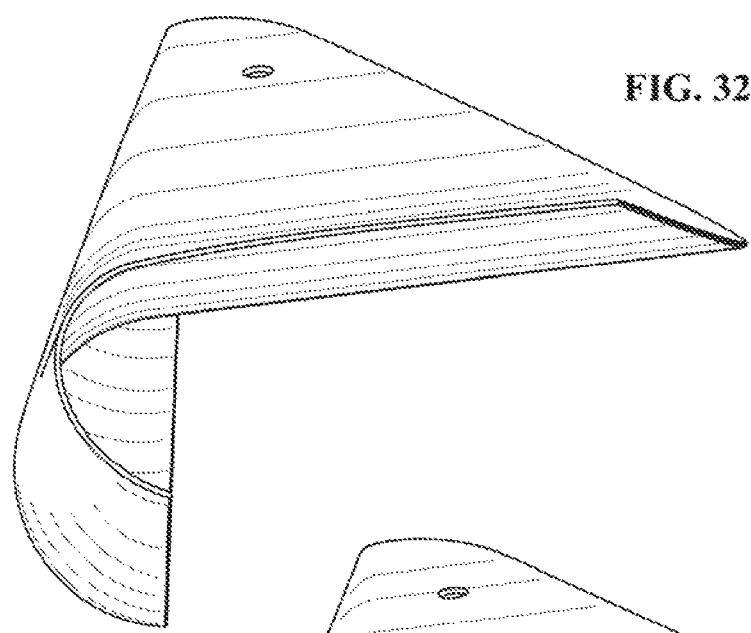
FIG. 32 is a cross section view taken along line 32-32 of FIG. 24.
Figure 33:
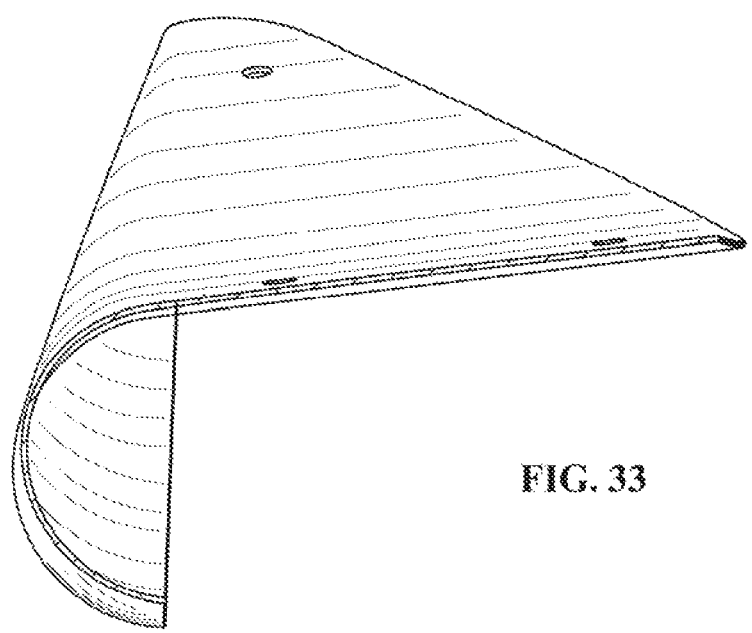
FIG. 33 is a cross section view taken along line 33-33 of FIG. 24.
Figure 34:
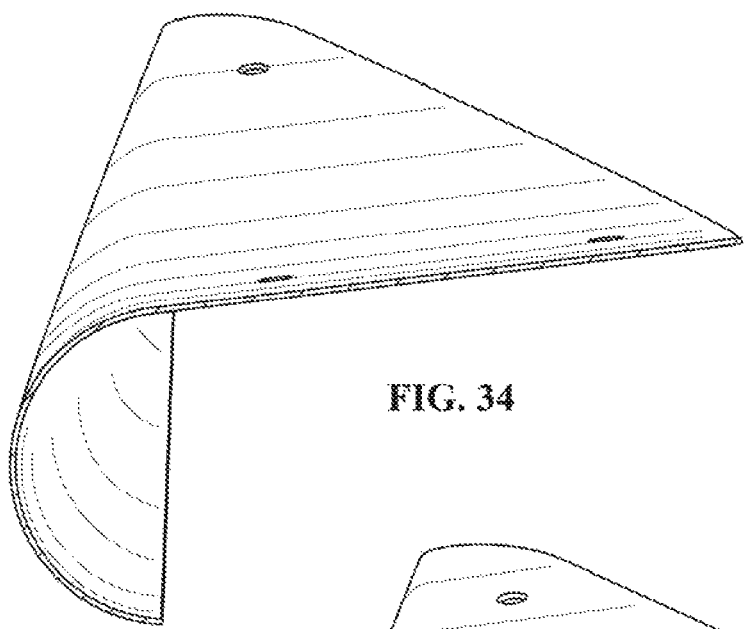
FIG. 34 is a cross section view taken along line 34-34 of FIG. 24.
Figure 35:
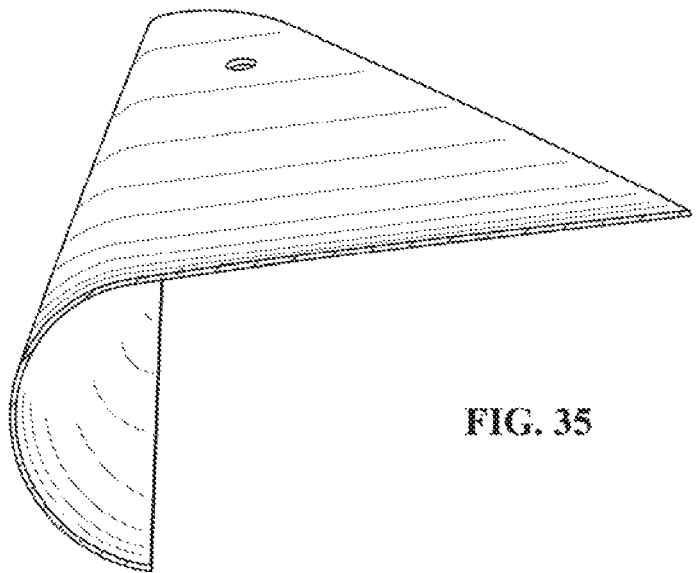
FIG. 35 is a cross section view taken along line 35-35 of FIG. 24.
Figure 36:
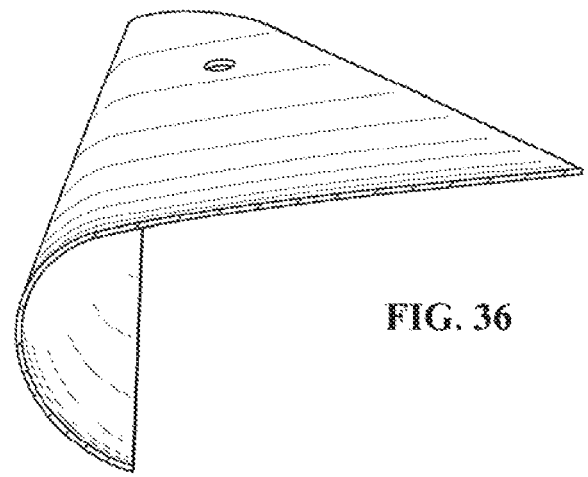
FIG. 36 is a cross section view taken along line 36-36 of FIG. 24.
Figure 39:
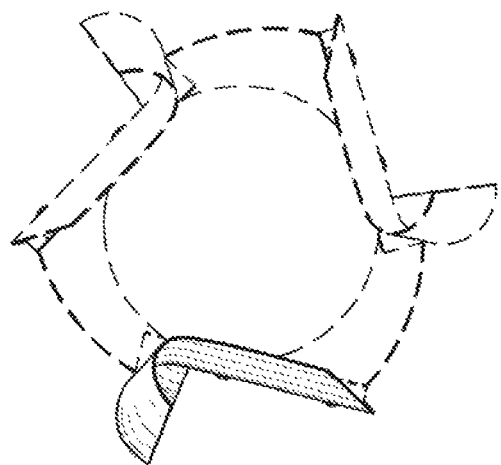
FIG. 39 is a cross section view taken along line 39-39 of FIG. 38.
Figure 40:
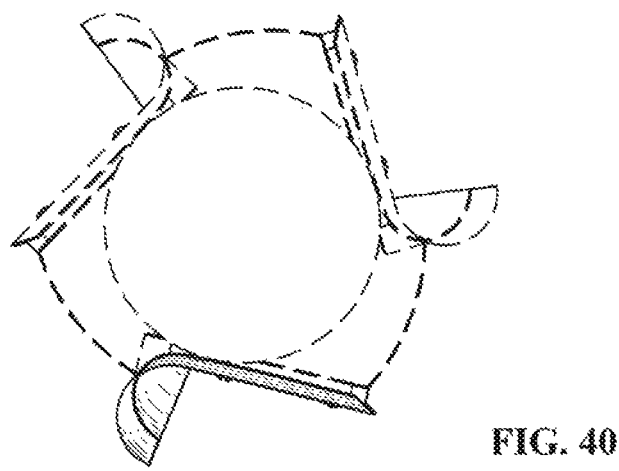
FIG. 40 is a cross section view taken along line 40-40 of FIG. 38.
Figure 41:
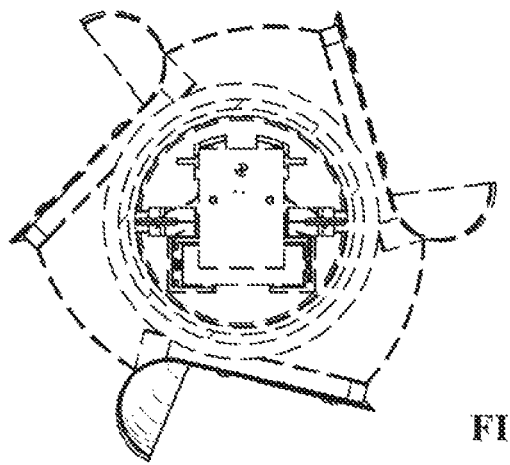
FIG. 41 is a cross section view taken along line 41-41 of FIG. 38.
Figure 42:
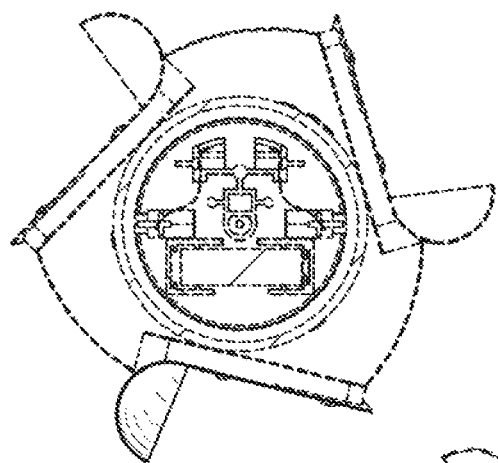
FIG. 42 is a cross section view taken along line 42-42 of FIG. 38.
Figure 43:
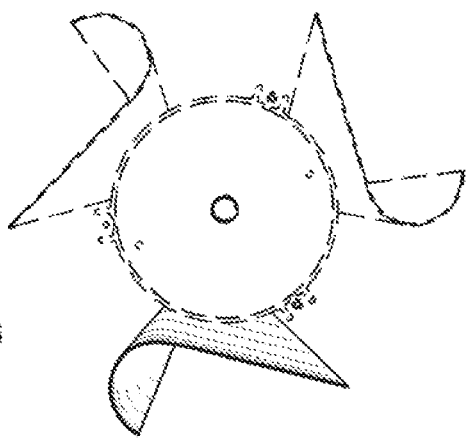
FIG. 43 is a cross section view taken along line 43-43 of FIG. 38.
Figure 44:
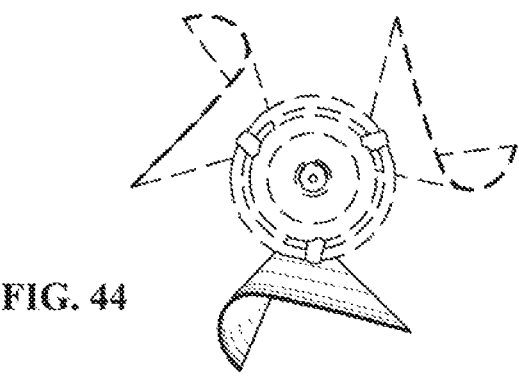
FIG. 44 is a cross section view taken along line 44-44 of FIG. 38; and, FIG. 45 is a cross section view taken along line 45-45 of FIG. 38.
Figure 45:
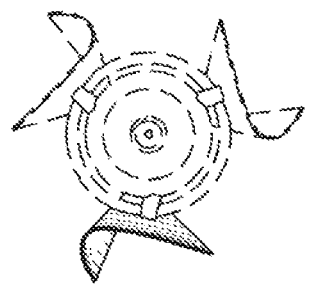

Referring now to FIG. 19, FIG. 20 and FIG. 21, shaft (81) is coupled to the revolving parts of the VAWT by two bearings (92). The stator (85) is fixedly attached to the shaft (81) and contains four coils (93). The four coils (93) are connected in series at locations (112), (113), and (114) (hidden from view). The two remaining wires (101) (102) at the ends of the in series coils pass up a slot (103) in shaft (81) and connect the coils to circuit board (94). The upper end of shaft (81) is attached to ornament platform (89) by screw (104). Wire (105) connects the circuit board (94) to positive battery contact (106) and wire (107) connects the circuit board to negative battery contact (108).

The ornament platform (89) is located directly above and in close proximity to the stator (85). This minimizes the length of shaft (81) which minimizes the distance from the circuit board (94) to the coils (93). The ornament platform (89) provides two posts (116) and a screw hole (117) to locate and attach PCB (94) using screw (119). Ornament platform (8) also provides a pocket (115) for battery (96) and two slots (118) for installing positive contact (106) and negative contact (108). Structures (120) and (121) capture springs (97) and (110) and hold them in place. Retaining clips (98) and (109) can slide in radially extending slots (122) formed on the ornament platform 89 and are pressed radially outward by springs (97) and (110), respectively. Latches (123) on the retaining clips (98) and (109) catch on tabs (not shown) on the underside of ornament platform (89) to prevent the retaining clips (98) and (109) from overextending. Tabs (100) are provided on the retaining clips (98) and (109) so that the retaining clips can be compressed manually if the decorative ornament (6) needs to be removed. In FIG. 19, retaining clip (109) is shown in its compressed position which releases the decorative ornament (6), whereas retaining clip (98) is shown in the extended position whereby it captures the decorative ornament (6) at contact point (111).

Decorative ornament (6) rests on ornament platform (89) and encloses and hides from view the battery (96), battery contacts (106) (108), circuit board (94), retaining clips (98) (109) and springs (97) (110). In a preferred embodiment, the decorative ornament (6) is a decorative hollow glass globe with an opening sized to fit ornament platform (89). A thin diffusing layer (99), preferably a thin layer of white glass, on the inside of the ornament reflects a portion of the light from LED (95) to evenly illuminate decorative ornament (6). The translucence of the diffusing layer (99) is chosen to maximize the light intensity on the surface of the decorative ornament (6) while remaining opaque enough to hide the structures internal to the ornament. Those skilled in the art will understand that methods other than a thin white layer of glass can achieve the same effect including, but not limited to, using frosted glass or adding diffusing agents or pigments to the glass. Materials other than glass could also be used.

Electronics on the circuit board (94) (not shown) control the charging of the battery and the illumination of the LED. In a preferred embodiment, the LED is illuminated at a first illumination level when dusk is detected. In order to minimize the drain on the battery (96), the illumination level is gradually reduced to a second illumination level. The first illumination level is brighter than the second illumination level. The transition time from the first illumination level to the second illumination level is chosen so the ornament will be brighter during the early part of the evening when it is most likely to be observed and dimmer, and therefore using less power, during late evening and early morning hours when the ornament is less likely to be observed. The LED is then turned off at dawn. In this manner, the ornament is illuminated from dusk to dawn but can use considerably less current that if the ornament was illuminated at the first illumination level for the entire night. In a preferred embodiment, the transition time from the first illumination level to the second illumination level is six hours and the first illumination level is eight times the second illumination level. As there are likely to be days and nights with little wind intermixed with days with lots of wind, it is desirable that the battery be able to provide illumination for multiple nights with little or no wind after being fully charged on a windy day. The first and second illumination levels and the time to gradually fade from the first illumination level to the second illumination level are selected so that the average current used during the night provides an acceptable tradeoff between brightness and battery life in this situation. In the preferred embodiment, the first illumination level is set by setting the LED current to 8 mA. Using commonly available LEDs with efficacies of 100 lumens/watt or more, this is enough illumination to create a pleasing ornament illumination level. The second illumination level is set by setting the current through the LED to 1 mA, which results in dimmer illumination of the decorative ornament, but is still adequate. Assuming a linear decrease in illumination, the average current during the first six hours of operation is then 4.5 mA. Assuming a 12 hour night, the remaining six hour before dawn will have an average current a 1 mA. The average current for a typical 12 hour night would then be 2.75 mA, thus consuming 33 mAHr in a single night assuming that only minimal current is used by the electronics. In the preferred embodiment, rechargeable battery (96) is a Lithium Phosphate, 3.2 volt battery with a 400 mAHr capacity, so if the battery is fully charged on a windy day it will be able to continue illuminating the ornament for at least ten nights without any additional wind.

While this invention has been described as having an exemplary design, the present invention may be further modified within the spirit and scope of this disclosure. This application is therefore intended to cover any variations, uses, or adaptations of the invention using its general principles.

What is claimed is:

1. A decorative ornament comprising:
   a vertical axis wind turbine comprising a plurality of blades adapted to rotate about a centrally located vertical shaft;
   wherein the vertical shaft comprises a top terminal end;
   a light emitting device secured to and located above the shaft top terminal end and within the rotating turbine blades;
   an alternator coupled to the blades and adapted to produce electric power for powering the light emitting device;
   wherein each of the blades comprise: a leading cupped section joined to a lagging airfoil section, wherein the leading cup section is defined by a cup radius r and the lagging airfoil section is defined by an airfoil chord length $C_L$;
   wherein the leading cupped section and lagging airfoil section extend vertically a distance h between terminal bottom and top ends; and,
   wherein the cup radius r and chord length $C_L$ both decrease towards the terminal bottom and top ends of the blade.

2. The decorative ornament of claim 1 wherein the alternator is located within the rotating turbine blades and comprises:
   a rotor rotatably coupled to the shaft;
   wherein the blades are secured to and rotatably drive the rotor about the shaft;
   a plurality of magnets secured to the rotor;
   a stator fixedly secured to the shaft;
   a plurality of coils of wire secured to the stator; and,
   when the rotor is rotably driven, the magnets travel adjacent and induce electric current in the coils of wire.

3. The decorative ornament of claim 1 wherein the vertical shaft comprises a bottom terminal end selectively attachable to a top terminal end of a ground mounting stake.

4. The decorative ornament of claim 1 further comprising a translucent enclosure located above the shaft top terminal end and within the rotating turbine blades and wherein light emitted by the light emitting device is directed within the enclosure.

5. The decorative ornament of claim 1 further comprising a translucent globe enclosure located above the shaft top terminal end and within the rotating turbine blades and wherein the light emitting device is located within the globe enclosure.

6. The decorative ornament of claim 1 further comprising an electric power storage device operatively connected to the alternator and the light emitting device.

7. The decorative ornament of claim 1 wherein the blades extend vertically between terminal bottom and top ends and the blades are secured to a rotor at a vertical midpoint between the terminal bottom and top ends.

8. The decorative ornament of claim 1 wherein the blades are secured to each other at a terminal bottom end thereof.

9. The decorative ornament of claim 1 wherein the blades are coupled to a rotor of the alternator, wherein the blades are attached to the rotor below a vertical midpoint between bottom and top terminal ends of the blades and wherein the blades are secured to each other at their bottom terminal end.

10. The decorative ornament of claim 1 wherein the cup radius r and chord length $C_L$ both decrease towards the terminal bottom and top ends of the blade starting form a vertical midpoint between the terminal bottom and top ends.

11. The decorative ornament of claim 1 wherein the airfoil section is located a radial distance $C_d$ from the vertical axis and wherein the radial distance $C_d$ decreases towards the terminal bottom and top ends of the blade starting form a vertical midpoint between the terminal bottom and top ends.

12. The decorative ornament of claim 1 wherein the airfoil section is located a radial distance $C_d$ from the vertical axis and wherein the radial distance $C_d$ decreases towards the terminal bottom and top ends of the blade.

13. The vertical axis wind turbine of claim 1 wherein the blades are formed of sheet material.

14. The vertical axis wind turbine of claim 1 wherein the alternator is selectively connectable to an electric power storage device through a load switch and further wherein, when an output of the alternator is insufficient to produce useful power, the electric power storage device is disconnected from the alternator and, after the blades and alternator gain momentum, the electric power storage device is again connected to the alternator.

15. The vertical axis wind turbine of claim 1 wherein the blades are coupled to an alternator adapted to produce electric power and the alternator is selectively connectable to a battery wherein, when the wind speed is too low to produce enough power to charge the battery, the load is disconnected from the alternator and the blades are allowed to spin freely.

16. The decorative ornament of claim 2 wherein the rotor comprises upper and lower magnet holders whereat the plurality of magnets are secured and the stator is sandwiched between the upper and lower magnet holders.

17. The vertical axis wind turbine of claim 12 wherein the leading cupped section extends between an outermost edge and an inner area, wherein the inner area is joined with the airfoil section and the outermost edge traverses along an arcuate path defined by a diameter D as the blades rotate about the vertical axis.

18. The vertical axis wind turbine of claim 12 wherein the blades are formed of sheet material.

19. The vertical axis wind turbine of claim 17 wherein $r/D < C_L/D < 1$.

20. A decorative ornament comprising:
   a vertical axis wind turbine comprising a plurality of blades adapted to rotate about a centrally located vertical shaft;
   wherein the vertical shaft comprises a top terminal end;
   a light emitting device secured to and located above the shaft top terminal end and within the rotating turbine blades;
   wherein the blades operate, for at least one wind speed, at both a low power operating point and a high power operating point;
   wherein the blades are coupled to an alternator and are adapted to produce electric power at both the low power operating point and the high power operating point;
   the alternator is selectively connectable to a load through a load switch; and,
   wherein, when an output of the alternator is determined to be on the lower power of two available operating points, the load is disconnected from the alternator and, after the blades and alternator gain momentum, the load is again connected to the alternator resulting in operation at the higher of the two operating points.

* * * * *

UNITED STATES PATENT AND TRADEMARK OFFICE
CERTIFICATE OF CORRECTION

PATENT NO. : 11,112,077 B2
APPLICATION NO. : 16/796823
DATED : September 7, 2021
INVENTOR(S) : Kim Irwin McCavit et al.

It is certified that error appears in the above-identified patent and that said Letters Patent is hereby corrected as shown below:

In the Specification

Column 3, Line 24, delete "form" and insert -- from --

Column 3, Line 29, delete "form" and insert -- from --

Column 6, Line 64, after "close" insert -- to --

In the Claims

Column 17, Claim 10, Line 17, delete "form" and insert -- from --

Column 17, Claim 11, Line 22, delete "form" and insert -- from --

Signed and Sealed this
Twenty-second Day of March, 2022

Drew Hirshfeld
*Performing the Functions and Duties of the
Under Secretary of Commerce for Intellectual Property and
Director of the United States Patent and Trademark Office*